United States Patent [19]

Cunto et al.

[11] Patent Number: 5,481,748
[45] Date of Patent: Jan. 2, 1996

[54] METHOD AND APPARATUS FOR REDUCING THE PROCESSING TIME REQUIRED TO SOLVE NUMERICAL PROBLEMS

[75] Inventors: Walter B. Cunto, Caracas; Jorge H. Goncalves, Miranda, both of Venezuela

[73] Assignee: International Business Machines Corporation, Armonk, N.Y.

[21] Appl. No.: 286,918

[22] Filed: Aug. 8, 1994

Related U.S. Application Data

[63] Continuation of Ser. No. 808,320, Dec. 13, 1991.

[51] Int. Cl.$^6$ .................................................. G06F 15/00
[52] U.S. Cl. ...................... 395/800; 395/375; 364/DIG. 1; 364/DIG. 2
[58] Field of Search .................................. 395/800, 375; 364/752, 715.06, 135, 754

[56] References Cited

U.S. PATENT DOCUMENTS

| | | | |
|---|---|---|---|
| 4,089,059 | 5/1978 | Miller et al. | 364/222.81 |
| 4,213,188 | 7/1980 | Smolko et al. | 364/739 |
| 4,309,761 | 1/1982 | Reach et al. | 364/706 |
| 4,381,554 | 4/1983 | Reach et al. | 364/706 |
| 4,774,685 | 9/1988 | Samuels | 364/718 |
| 5,025,408 | 6/1991 | Sherman | 364/759 |
| 5,047,973 | 9/1991 | Steiss et al. | 364/754 |
| 5,159,567 | 10/1992 | Gobert | 364/757 |
| 5,185,714 | 2/1993 | Nakayama | 364/750.5 |
| 5,274,832 | 12/1993 | Khan | 395/800 |

OTHER PUBLICATIONS

Mesh Computer Algorithms for Computational Geometry, IEEE 1989 publication pp. 321–340, by Miller et al.

*Primary Examiner*—Parshotam S. Lall
*Assistant Examiner*—Zarni Maung
*Attorney, Agent, or Firm*—Floyd A. Gonzalez; Blanche E. Schiller

[57] ABSTRACT

The invention discloses a method and apparatus for solving a wide range of numerical problems that use N processing elements operating in parallel.

To find the solution for a given problem relating to a given function function N points are selected in a determined interval wherein resides the solution. Such interval is known as the initial search interval and it is determined according to said given problem. Once the N points are selected the search interval is divided into smaller sub-intervals. The N processing elements are used to perform evaluations of the function at each of the N selected points, whereby the criteria for said evaluations are also determined according to said given problem. The results of the evaluations are used to determine the next search interval that is smaller than the previous one. The new search interval is divided into smaller parts in the same fashion as described above and further function evaluations are performed at given selected points. The aforementioned steps are repeated until the search interval is reduced to a predetermined size which is also defined according to said given problem. At this point the solution for said given problem can be selected from this last search interval known as the final interval. The apparatus for the present invention uses N processing elements operating in parallel to perform evaluations of the given function at selected points. When the invention is applied in digital computers for solving numerical problems involving a floating point domain, where points are represented by binary numbers according to a given pattern, selection of the N points in the search interval is implemented by a series of assemblers that build binary numbers.

37 Claims, 12 Drawing Sheets

$t = 9 \quad v = 1 \quad r = 2$

1st ITERATION

$a = c_0 = x_0 = \langle 1\,0\,1 \rangle \quad \langle 0\,0 \rangle \quad \langle 0\,0\,0\,0 \rangle$
$x_1 = \langle 1\,0\,1 \rangle \quad \langle 0\,1 \rangle \quad \langle 0\,0\,0\,0 \rangle$
$x_2 = \langle 1\,0\,1 \rangle \quad \langle 1\,0 \rangle \quad \langle 0\,0\,0\,0 \rangle$
$x_3 = \langle 1\,0\,1 \rangle \quad \langle 1\,1 \rangle \quad \langle 0\,0\,0\,0 \rangle = x_s$
$c_1 = x_4 = \langle 1\,1\,0 \rangle \quad \langle 0\,0 \rangle \quad \langle 0\,0\,0\,0 \rangle$
$x_5 = \langle 1\,1\,0 \rangle \quad \langle 0\,1 \rangle \quad \langle 0\,0\,0\,0 \rangle$
$x_6 = \langle 1\,1\,0 \rangle \quad \langle 1\,0 \rangle \quad \langle 0\,0\,0\,0 \rangle$
$x_7 = \langle 1\,1\,0 \rangle \quad \langle 1\,1 \rangle \quad \langle 0\,0\,0\,0 \rangle$
$b = c_2 = x_8 = \langle 1\,1\,1 \rangle \quad \langle 0\,0 \rangle \quad \langle 0\,0\,0\,0 \rangle$

2nd ITERATION

$a = c_0 = x_0 = \langle 1\,0\,1\,1\,1\,1 \rangle \quad \langle 0\,0 \rangle \quad \langle 0\,0 \rangle$
$x_1 = \langle 1\,0\,1\,1\,1\,1 \rangle \quad \langle 0\,1 \rangle \quad \langle 0\,0 \rangle$
$x_2 = \langle 1\,0\,1\,1\,1\,1 \rangle \quad \langle 1\,0 \rangle \quad \langle 0\,0 \rangle$
$x_3 = \langle 1\,0\,1\,1\,1\,1 \rangle \quad \langle 1\,1 \rangle \quad \langle 0\,0 \rangle$
$c_1 = x_4 = \langle 1\,1\,0\,0\,0\,0 \rangle \quad \langle 0\,0 \rangle \quad \langle 0\,0 \rangle$
$x_5 = \langle 1\,1\,0\,0\,0\,0 \rangle \quad \langle 0\,1 \rangle \quad \langle 0\,0 \rangle$
$x_6 = \langle 1\,1\,0\,0\,0\,0 \rangle \quad \langle 1\,0 \rangle \quad \langle 0\,0 \rangle$
$x_7 = \langle 1\,1\,0\,0\,0\,0 \rangle \quad \langle 1\,1 \rangle \quad \langle 0\,0 \rangle$
$b = c_2 = x_8 = \langle 1\,1\,0\,0\,1 \rangle \quad \langle 0\,0 \rangle \quad \langle 0\,0 \rangle$ $x_2 = x_s$
$x_4 = x_{s'}$

3rd ITERATION

$a = c_0 = x_0 = \langle 1\,0\,1\,1\,1\,1\,1\,0 \rangle \quad \langle 0\,0 \rangle$
$x_1 = \langle 1\,0\,1\,1\,1\,1\,1\,0 \rangle \quad \langle 0\,1 \rangle$
$x_2 = \langle 1\,0\,1\,1\,1\,1\,1\,0 \rangle \quad \langle 1\,0 \rangle$
$x_3 = \langle 1\,0\,1\,1\,1\,1\,1\,0 \rangle \quad \langle 1\,1 \rangle$
$c_1 = x_4 = \langle 1\,0\,1\,1\,1\,1\,1\,1 \rangle \quad \langle 0\,0 \rangle$
$x_5 = \langle 1\,0\,1\,1\,1\,1\,1\,1 \rangle \quad \langle 0\,1 \rangle$
$x_6 = \langle 1\,0\,1\,1\,1\,1\,1\,1 \rangle \quad \langle 1\,0 \rangle = x_s$
$x_7 = \langle 1\,0\,1\,1\,1\,1\,1\,1 \rangle \quad \langle 1\,1 \rangle$
$b = c_2 = x_8 = \langle 1\,1\,0\,0\,0\,0\,0\,0 \rangle \quad \langle 0\,0 \rangle = x_{s'}$

FINAL INTERVAL

$a = c_0 = \langle 1\,0\,1\,1\,1\,1\,1\,0 \rangle$
$c_1 = \langle 1\,0\,1\,1\,1\,1\,1\,1 \rangle$
$b = c_2 = \langle 1\,1\,0\,0\,0\,0\,0\,0 \rangle$

METHOD AND APPARATUS FOR REDUCING THE PROCESSING TIME REQUIRED TO SOLVE NUMERICAL PROBLEMS

This application is a continuation of application Ser. No. 07/808,320, filed Dec. 13, 1991.

BACKGROUND OF THE INVENTION

1. Field of the Invention

The present invention relates to a method and apparatus for solving a wide range of numerical problems. More particularly, the invention relates to a method and apparatus that substantially reduces the processing time required to solve numerical problems by using independent processing elements operating in parallel and by exploiting the parallel nature of problems. The invention is a powerful framework for the design and hardware implementation of numerical algorithms, whereby the algorithms can be configured and scaled according to circuit characteristics, such as packing density and switching time, which constantly change following computer technology trends.

2. Prior Art

The use of numerical applications based on floating point calculations in data processing system environments have been a common practice since the early years of computer technology. High speed processing has always been an important target in the development of many methods and apparatuses that provide solutions to numerical problems.

Most of the proposed solutions have been implemented with emphasis on software rather than on hardware, and prior an hardware-based solutions were always proposed to solve specific or low level problems. For example, U.S. Pat. No. 4,477,879 by Wilson T. C. Wong, issued on Oct. 16, 1984, and assigned to Sperry Corporation, entitled *Floating Point Processor Architecture Which Performs Square Root by Hardware,* is a specific hardware-based solution for the calculation of the square root of floating point numbers. Another example, U.S. Pat. No. 4,849,923 by Samudrala et al, issued on Jul. 18, 1989 and assigned to Digital Equipment Corporation, entitled *Apparatus and Method for Execution of Floating Point Operations,* is limited to the execution of arithmetic operations on floating point operands. This invention has a low level approach since it focuses only on the execution operations, and it does not propose solutions to high level and more generic numerical problems.

Recently, much attention has been given to parallelism, which is a fine concept used in the development of methods to solve numerical problems. Various approaches of parallelism with complementary points of view have been considered and various methods have been developed.

One approach to parallelism is migration parallelism, where sequential algorithms are adapted to run on parallel architectures. Different steps of a program are executed in parallel. This approach is embedded in applications such as those described in *Pseudo Division and Pseudo Multiplication Processes* by J. E. Meggit, IBM J. Res. Develop., 6, 210–226 (1962); *Cellular Logical Array for Nonrestoring Square-Root Extraction* by H. H. Guild, Electron Lett., 6, 66–67 (1970); *Cellular Array for Extraction Squares and Square Roots of Binary Numbers* by J. C. Majithia, IEEE Trans. Comput., 21, 1023–1024 (1972); and *Design of a High Speed Square Root Multiply and Divide Unit* by J. H. P. Zurawski and J. B. Gosling, IEEE Trans. Comput., 36, 13–23 (1987). Although this approach focuses on parallelism, it actually implements a conversion of sequential solutions to parallel solutions. Since it is not originally a parallel approach, it is limited to a sequential approach. This limitation reduces the degree of parallelism and the range of feasible processing speed that can be achieved.

Another approach proposed is based on master/slave parallelism. In this case, the problem is partitioned into m sub-problems of the same kind with the division of the decision space into m parts. Each sub-problem is solved and interrelated to the others in a hierarchical fashion. This hierarchical interrelation between sub-problems and the fact that all sub-problems must be necessarily solved in order to reach the solution may demand complex control activities, which may also cause overhead, thus decreasing efficiency on the processing time achieved. Monte Carlo parallelism could be considered as a special case of master/slave parallelism since the decision space is sampled. This is a simple approach of using parallelism to solve numerical problems, but due to its probabilistic nature, it is limited and not 100% reliable. Master/slave parallelism is cited in "The Logic of Computer Arithmetics" by I. Flores, Englewood Cliff, Prentice Hall 1963 and embedded in the problems presented in *Cellular Logic Array for Extracting Square Roots* by K. J. Dean, Electron. Lett., 4, 314–315 (1968); *Economic Pseudo-division Processes for Obtaining Square Roots, Logarithms and Arctan* by B. P. Sarkar and E. V. Krishnamutry, IEEE Trans. Comput., 20, 1589–1593 (1971); and *Square-Rooting Algorithms for High-Speed Digital Circuits* by S. Majerski, IEEE Trans. Comput., 34, 724–733 (1985).

None of these proposed approaches are well suited for global analyses of functions over search intervals, for example, finding all critical points of a function (zeros, minima, maxima, etc.) within an interval. The above mentioned approaches are limited to a local analysis of a specific problem. Generally, the methods and apparatuses of the prior art do not substantially take advantage of computer technology trends such as chip packing density availability, switching time, and size of floating point representations. In addition, prior art methods and apparatuses do not provide great flexibility for the design of hardware-based algorithms.

OBJECTS OF THE INVENTION

It is an object of the present invention to provide a method and apparatus for solving a wide range of numerical problems that substantially reduces the processing time required to solve referred problems.

It is also an object of the current invention to provide a hardware based rather than software based method and apparatus for solving a wide range of numerical problems.

It is another object of the present invention to provide a method and apparatus that provides a powerful framework for the design of parallel hardware based algorithms and the implementation of specific hardware.

It is an additional object of the present invention to provide a method and apparatus that take advantage of technology trends in computer industry such as chip packing density, switching time, and size of floating point representations.

It is a further object of the present invention to provide a method and apparatus that permit a global analysis of different problems that involve a given function and, for each problem, a determined interval in the domain of said given function wherein resides the solution for said problem, usually named as the search interval.

It is yet another object of the invention to provide a method and apparatus that compute at once a group of bits of the final solution of a given problem by iteratively using a number of processing elements to evaluate, in parallel, the value of a given function at given points selected in the search interval.

BRIEF DESCRIPTION OF THE INVENTION

In order to achieve above mentioned and other objects, a method and apparatus is provided for solving a wide range of numerical problems by using N processing elements operating in parallel. To find the solution for a given problem relating to a given function N points are selected in a determined interval wherein resides the solution. Such interval is known as the initial search interval and it is determined according to said given problem. Once the N points are selected the search interval is divided into smaller sub-intervals. The N processing elements are used to perform evaluations of the function at each of the N selected points, whereby the criteria for said evaluations are also determined according to said given problem. The results of the evaluations are used to determine the next search interval that is smaller than the previous one. The new search interval is divided into smaller parts in the same fashion as described above and further function evaluations are performed at given selected points. The aforementioned steps are repeated until the search interval is reduced to a predetermined size which is also defined according to said given problem. At this point the solution for said given problem can be selected from this last search interval known as the final interval. The apparatus for the present invention uses N processing elements operating in parallel to perform evaluations of the given function at selected points. When the invention is applied in digital computers for solving numerical problems involving a floating point domain, where points are represented by binary numbers according to a given pattern, selection of the N points in the search interval is implemented by a series of assemblers that build binary numbers.

BRIEF DESCRIPTION OF THE DRAWINGS

FIG. 3 shows the binary representation of points selected in the search interval.

FIG. 4 illustrates an example where three iterations of the claimed method is performed.

DETAILED DESCRIPTION OF THE INVENTION

Figure 1:
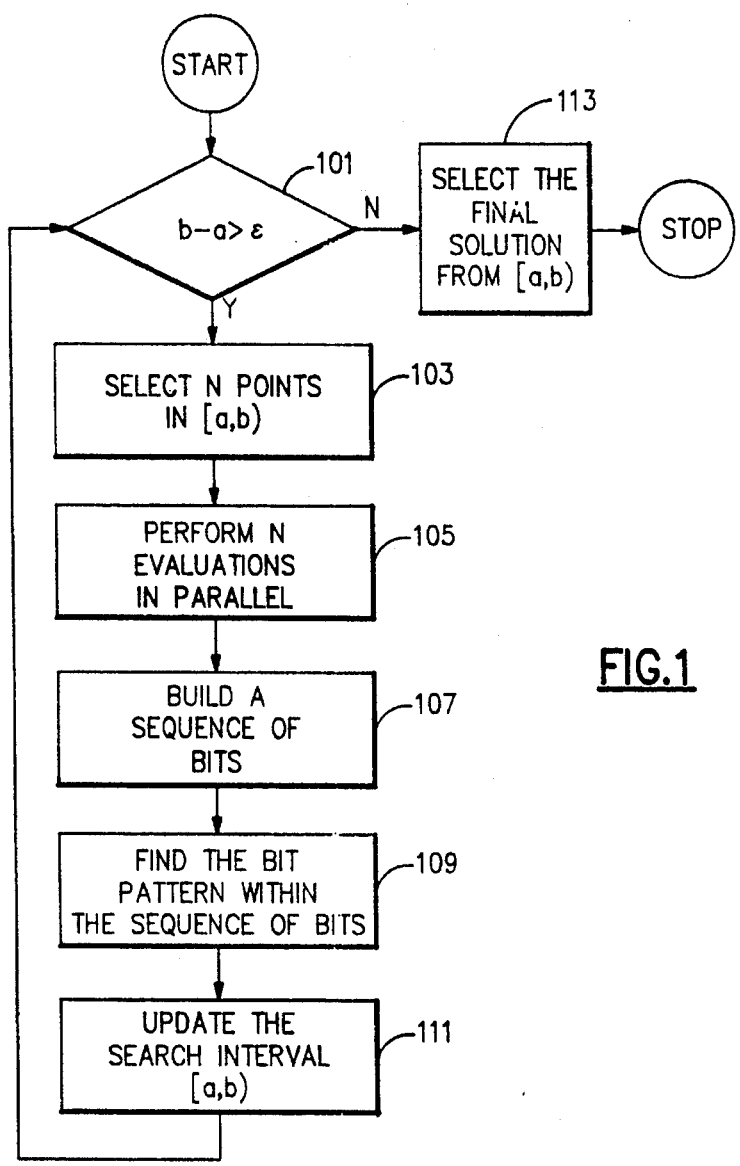
FIG. 1 is a flow chart showing the steps of the claimed method applied to solve a given problem.

The invention provides a new method and apparatus that substantially reduce the processing time required to solve a wide range of numerical problems by using N processing elements operating in parallel.

The basic idea of the method is that N processing elements, where $N \geq 1$, are concurrently applied to points in an initial search interval [a,b]. The N processing elements perform evaluations in parallel which may include, for example, arithmetic and relational operations. The results obtained from the parallel computations are then used to shrink the search interval [a,b] into a smaller new search interval. The process is repeated until a sufficiently small interval containing the solution is reached. The number of processing elements N will depend on the hardware used to implement the method which in turn is determined according to the packing density technology used to pack the processing elements on chips.

Since the present method provides solutions for a wide range of numerical problems, most of its steps deal with parameters and criteria that will depend on the specific problem the method is solving. In this connection, the initial search interval [a,b], the criteria for evaluations, the determination of the new search interval, and the size $\epsilon$ to which the search interval must be reduced so as to contain the solution are defined according to the problem being solved. These values belong to a set hereinafter referred as the set of problem dependent parameters. A general description of the claimed method applied to solve a given problem is explained based on the flowchart shown in FIG. 1.

Once the values and criteria mentioned above are known, decision Step 101 compares the size of the initial search interval [a,b) to $\epsilon$, referred as the stopping criterion. If the size of the search interval is greater than the stopping criterion, the method branches from the YES decision to Step 103.

In Step 103, N different points $x_i$, $1 \leq i \leq N$, are selected in the search interval dividing same into smaller sub-intervals such that $$a \leq x_1 < x_2 \ldots < x_{N-1} < x_N \leq b, N \geq 1.$$

Next, in Step 105, the N processing elements available perform evaluations in parallel at each of the N points selected in the search interval in the previous step. Each evaluation issues either a binary 1 or a binary 0 result.

In step 107, a sequence of bits corresponding to the results of the evaluations is built as $$z=<z_1 z_2 \ldots z_N>$$

where $z_i$ are bits.

Next, in step 109, the sequence of bits built in the previous step is analyzed and the method searches for a bit pattern pat, within the sequence of bits z, where pat is also a problem dependent parameter. The initial and final positions of referred pattern, s and s' respectively, are computed. The relation between initial and final positions is stated as s'=s+|pat|−1, where |pat| is the length of referred bit pattern pat.

In step 111, the search interval is updated. The new search interval is defined by the interval between the two selected points corresponding to the positions of the first and last bits of bit pattern pat found in Step 109, which is $[x_s, x_{s'}]$. This new interval contains the solution $x^*$ and it is smaller than the previous one, that is, $$|x_s, x_{s'}|, \ 1 \leq s < s' \leq N, \ x_{s'} - x_s < b - a.$$

The search interval is then updated by substituting the values of a and b by $x_s$ and $x_{s'}$ respectively.

From Step 111, the method loops back to decision Step 101 and the new search interval is compared to $\epsilon$. The method follows the YES branch and the subsequent steps described above until the search interval is reduced to a size that is smaller or equal to $\epsilon$.

When above condition is satisfied, the method branches from the NO decision to final step 113 and the solution is selected from the current search interval [a,b]. While a, the left extreme point, is the lower bound solution, b, the right extreme point, could be referred as the upper-bound solution.

When the present method is used in digital computers to solve numerical problems over a floating point domain, the general idea of performing several concurrent evaluations allows the method to build the solution $x^*$ in groups of bits at a time. This feature constitutes one the most important objects of the invention.

The following explanation will show how this feature is achieved. To simplify the explanation and without loss of generality, let us assume that the floating point numbers are scaled to non negative integers represented with t bits.

Figure 2:
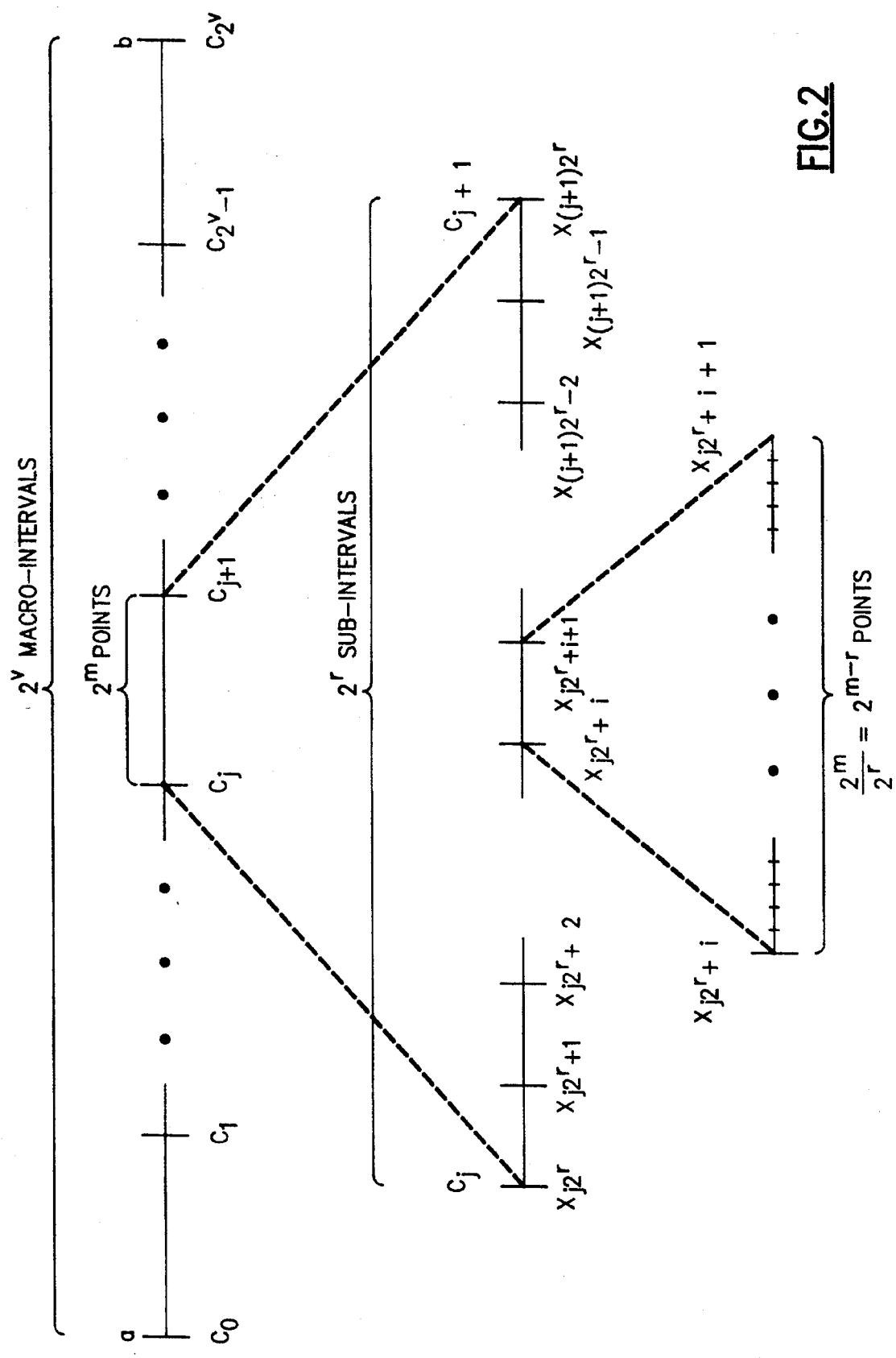
FIG. 2 shows division of the search interval into macro-intervals and following division of macro-intervals into sub-intervals.

As illustrated in FIG. 2, the current search interval is divided into $2^v$ equally spaced macro-intervals, where $v \geq 0$ is a function of |pat|, as will be seen later. This is achieved by selecting $2^v + 1$ points $c_j$, $0 \leq j \leq 2^v$, not necessarily equal to N, such that the search interval boundaries a and b are selected as the first and last points respectively, that is, $$c_0 = a \text{ and } c_l = b, \text{ where the index } l = 2^v.$$

Each macro-interval contains $2^m$ points. This gives a total of $2^{m+v}$ points in the search interval where m and v are non negative integers.

Considering the previous assumption that the points are represented with t bits and that there are $2^m - 1$ points between two consecutive points $c_j$, i.e., $$c_j - c_{j-1} = 2^m, \ 1 \leq j \leq 2^v,$$

we can represent said points as a sequence of t—m bits followed by a sequence of m zero bits as follows:

$$c_j = <c_{j,t}, c_{j,t-1} \ldots c_{j,m+1}><0>_m, \ 0 \leq j \leq 2^v,$$

where $c_{j,h}$, $0 \leq j \leq 2^v$, $m+1 \leq h \leq t$, are bits and $<0>^m$ is a sequence of m zero bits. Note that variations of the m least significant bits in the above representation will form all $2^m$ points within each macro-interval.

We can rapidly approach the solution in groups of r bits at a time by shrinking the current search interval $2^r$ times during each iteration, where $r \geq 1$. As seen in FIG. 2, this can be achieved by further dividing each of said macro-intervals into $2^r$ equally spaced sub-intervals and by selecting $2^r - 1$ points internal to each macro-interval. This gives a total of $2^{v+r}$ sub-intervals within the whole current search interval. Note that the division of the search interval into macro-intervals and sub-intervals must consider the value of N—the number of processing elements available—since each processing element can only evaluate one point at a time.

The binary representation for any of the points selected for division of the search interval considers the j-th macro-interval wherein the point is contained, the position k of the point in the macro-interval, and the binary representation of k with r bits denoted as $<k_r \ldots k_1>$, such that:

$$x_i = <c_{j,t}, c_{j,t-1} \ldots c_{j,m+1}><k_r \ldots k_1><0>_{m-r}$$

where $$i = j2^r + k, \ 0 \leq j \leq 2^v - 1 \text{ and } 0 \leq k \leq 2^r - 1, \text{ or, } i = 2^v \text{ and } k = 0.$$

Note that $x_i$ is a general representation of all points selected in the search interval and it also includes the points $c_j$ that define the macro intervals. In other words, points $c_j$ are also $x_i$ points in this representation since $$c_j = x_h, \ h = j2^r, \ 0 \leq j \leq 2^v.$$

Figure 3:
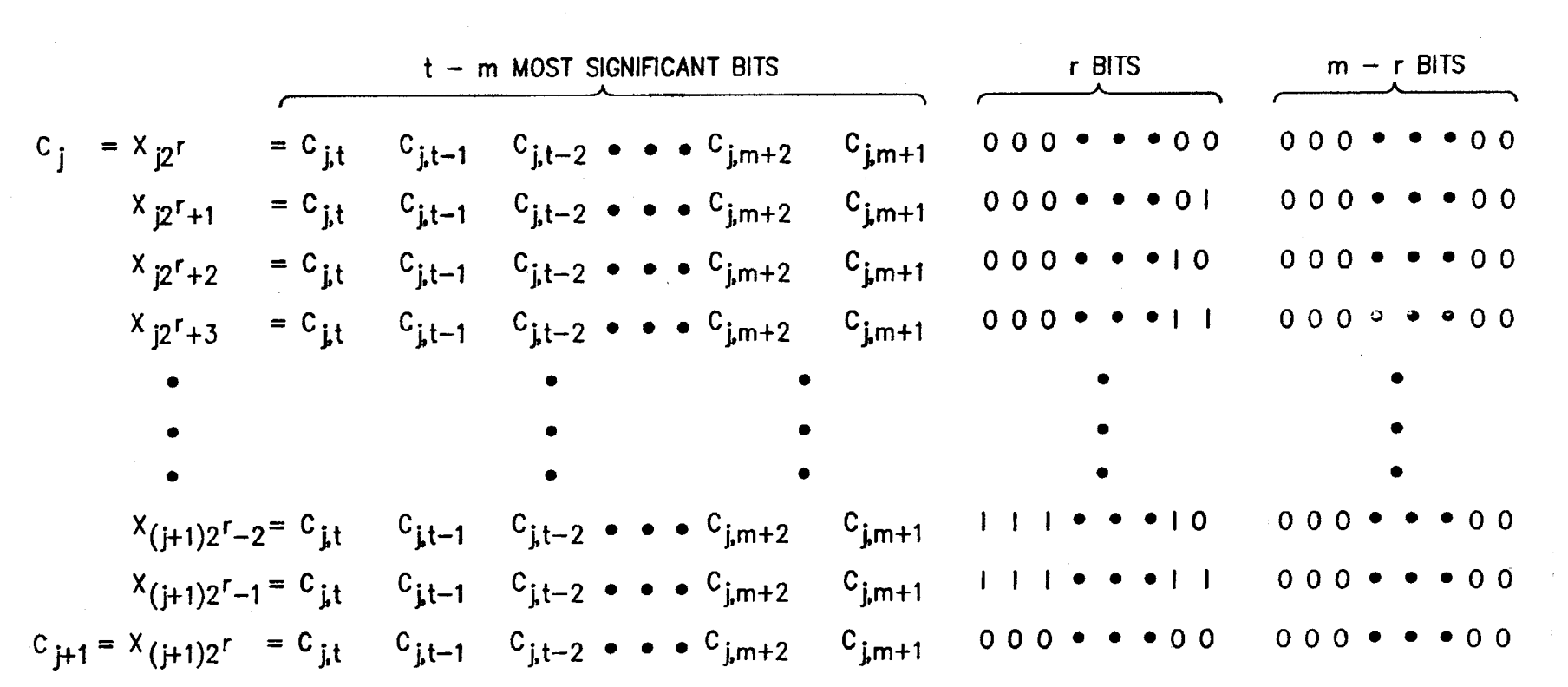

FIG. 3 illustrates this binary representation and the relationship between the index k and its binary representation with r bits when considering sub-intervals within macro-intervals. In a given macro-interval, the t—m most significant bits are kept constant while the m least significant bits vary. Similarly, within a sub-interval, besides the t—m most significant bits, also the following r most significant bits are kept constant while the m−r least significant bits vary. Furthermore, said r bits correspond to the binary representation of the position k of the point in a macro-interval.

Even though the value of r belongs to the set of problem dependent parameters, it is a much more dynamic value since it may change during the computation of the solution, as it will be seen in one of the applications of the method developed hereinafter, where different versions of the method, each one with a different value of r, are applied to solve a specific problem.

Following it will be shown how v is related to bit pattern pat. In general, s'=s+|pat|−1. The simplest case is when the problem being solved defines a bit pattern with a length of two bits (|pat|=2), for example, 10. In this case, the new search interval has the length of a single sub-interval, and in the next iteration only one macro-interval is selected. When |pat|=3, the next search interval has a length of two sub-intervals, and in the next iteration two macro-intervals will be selected. When |pat|=7, the next search interval has a length of six sub-intervals, and eight macro-intervals are needed in the next iteration. Note that the number of macro-intervals keep the following relation with |pat|: $2^v = |pat| - 1$. Therefore, $v = \log(|pat| - 1)$, where $\log(x)$ denotes the binary logarithm of x. However, in order to apply the method iteratively to numbers in binary form, $x_{s'} - x_s$ must be a power of 2, which means that the number of points in the new search interval is a power of 2. Therefore, s'=s+|pat|−1 applies in this context only if |pat|−1 is a power of 2.

If this is not true, we must add to s the smallest power of 2 greater than or equal to |pat|−1) in order to calculate s'. In this connection, v is the following greater integer of log(|pat|−1) or simply $v=\|\log(|pat|-1)\|$, where the notation $\|x\|$ represents the smallest integer greater than or equal to x. This implies that $2^v=2^{\|\log(|pat|-1)\|} \geq |pat|-1$ and $s'=s+2^v$. For example, if pat is the bit pattern 110 then |pat|=3 and v=1, if pat is the bit pattern 110100 then |pat|=6 and v=3.

Based on the previous explanation, we note that when applying the current method to solve numerical problems over a floating point domain, the stopping criterion $\epsilon$ in decision step 101 of FIG. 1 is equal to $2^v$, i.e., the current search interval must be greater than $2^v$ since the iterative division of the search integral into macro-intervals and sub-intervals must stop when adjacent macro-intervals has a common minimum length of 1. In step 103, N points from the $2^{v+r}+1$ points used to divide the search interval are selected for function evaluation. The following steps are the same as described previously in the general description of the claimed method.

A hypothetical example with three iterations is given in FIG. 4 in order to illustrate how the process of shrinking the search interval is carded out and how macro-intervals and sub-intervals interrelate during this process. The binary representation of selected points $x_i$ is also illustrated in this example. Note that the middle sequence of bits $<k_2k_1>$ corresponds to the binary representation of the index i associated to the point. In this example, t=9, v=1, and r=2. The search interval is divided into 2 macro-intervals and each macro-interval is divided into 4 sub-intervals. At the end of the first iteration of the method, the new search interval is the interval between $x_s=x_3$ and $x_{s'}=x_5$, which is further divided into 8 sub-interval for the second iteration. After the second iteration, the current search interval is reduced to the interval between $x_2$ and $x_4$. Finally, in the third iteration, the search interval is confined between $x_6$ and $x_8$. Note that at each iteration, two bits are computed and the search interval shrinks $2^r=2^2=4$ times. After the third iteration, consecutive points $c_j$ differ only by one and the stopping criterion is satisfied.

As said before, the present invention provides a method and apparatus for solving a wide range of numerical problems over a floating point domain that substantially reduces the processing time required to solve said problems. Six applications of the method are described for purposes of illustration. Each application solves a specific problem.

In order to simplify the description of the applications, the assumptions made previously are maintained. Further refinement of the implementations proposed are possible when specific functions are considered.

The following six applications of the invention are:
i) finding a zero of a given function in a given interval;
ii) finding a fixed point of a given function in a given interval;
iii) finding a minimum or maximum of a given function in a given interval;
iv) finding a saddle point of a given function in a given interval;
v) finding all the critical points (zeros, minima, maxima, fixed points and saddle points) of a given function in a given interval;
vi) calculation of the square root a floating point number.

The problem of finding a zero of a function.

It is well known that a continuous function f(x) has at least one zero within an interval |a,b) if and only if f(a)f(b)<0. Moreover, if the function f(x) is non decreasing, only one zero is present within the search interval. Under such assumptions, if many function evaluations are performed within the interval, the new search interval will be confined between the two consecutive points where the change of sign of corresponding evaluations has occurred. Thus, for this particular problem, the length of the bit pattern pat used to search the next interval is equal to 2. Furthermore, if the criteria for evaluation is such that, a binary 1 is added to the sequence of bits z whenever the value of the function f(x) at one of the N selected points is non positive and a binary 0 is added otherwise, the bit pattern pat is 10, and the sequence of bits z is a subsequence of ones followed by a subsequence of zeros. The case of a non increasing function is handled symmetrically.

Since |pat|=2 and |pat|−1=1 is a power of 2, v is the following integer greater than or equal to log(|pat|−1), which is 0. The number of macro-intervals is given by $2^v=1$, and the only one macro-interval is selected as the initial search interval, such that, $a=c_0$ and $b=c_1$.

Without loss of generality, two further simplifications are assumed in this problem: $f(x^*)\neq 0$, which means the solution $x^*$ is neither a maximum nor a maximum or a saddle point, and that r is a factor of m and kept constant along the iterations in order to avoid special considerations for the computation of the least significant bits of the solution.

The current search interval is then divided into $2^r$ sub-intervals by selecting $2^r-1$ internal points $x_i$, $1 \leq i \leq 2^r-1$.

The value of r is chosen such that the number of processing elements N is greater than or equal to $2^r-1$, which will be the number of internal points selected.

Next, $2^4-1$ processing elements evaluate in parallel the function f(x) at corresponding internal points $x_i$ according to the criteria described above, i.e., the result of each evaluation is a binary digit $z_i$, such that, $$z_i=(f(x_i)\leq 0), 1\leq i \leq 2^r-1,$$

i.e., $z_i$ is 1 if above logic expression is true, and it is 0 if the expression is false.

The sequence z of $2^r-1$ bits corresponding to the results of the evaluations is built, and the bit pattern 10 is searched within the sequence z. The initial and final positions of bit pattern pat are computed as:

$$s = \sum_{i=1}^{N} z_i \text{ and } s' = s + 1,$$

respectively.

The interval shanks $2^r$ times and the new interval boundaries are updated, where $$a=x_s \text{ and } b=x_{s+1}.$$

At the end of each iteration the following r most significant bits of the solution are computed.

The stopping criterion $\epsilon$ is equal to $2^v=2^0=1$; i.e., there will be only one integer in the interval |a,b) when the size of same is reduced to 1. The final value of a is chosen as the solution $x^*$ and b can be referred as the upper bound solution.

While the updated search interval is greater than 1 referred search interval is divided into $2^r$ sub-intervals and the whole process is repeated. As seen above, when the updated search interval is reduced to 1, the final solution will be a.

The above mentioned assumptions were made for purposes of simplification only. They are not needed in general, as shown in the fifth application of the method described hereinafter.

For further clarification, let us consider the numerical example that finds the zero of the function $f(x)=x^2-2500=(x-500)(x+500)$ in the initial interval $|32,64)$. Note that in this interval the function is non decreasing and 500 is the only zero. Considering the previous assumptions, the bit pattern that defines the next search interval is 10. Thus, them is only one macro-interval which is equal to the initial search interval. If we want to process two bits of the solution at each step (r=2), the interval must be divided into 4 sub-intervals and 3 internal points need to be selected, and the number of processing elements must be at least 3.

Figure 5:
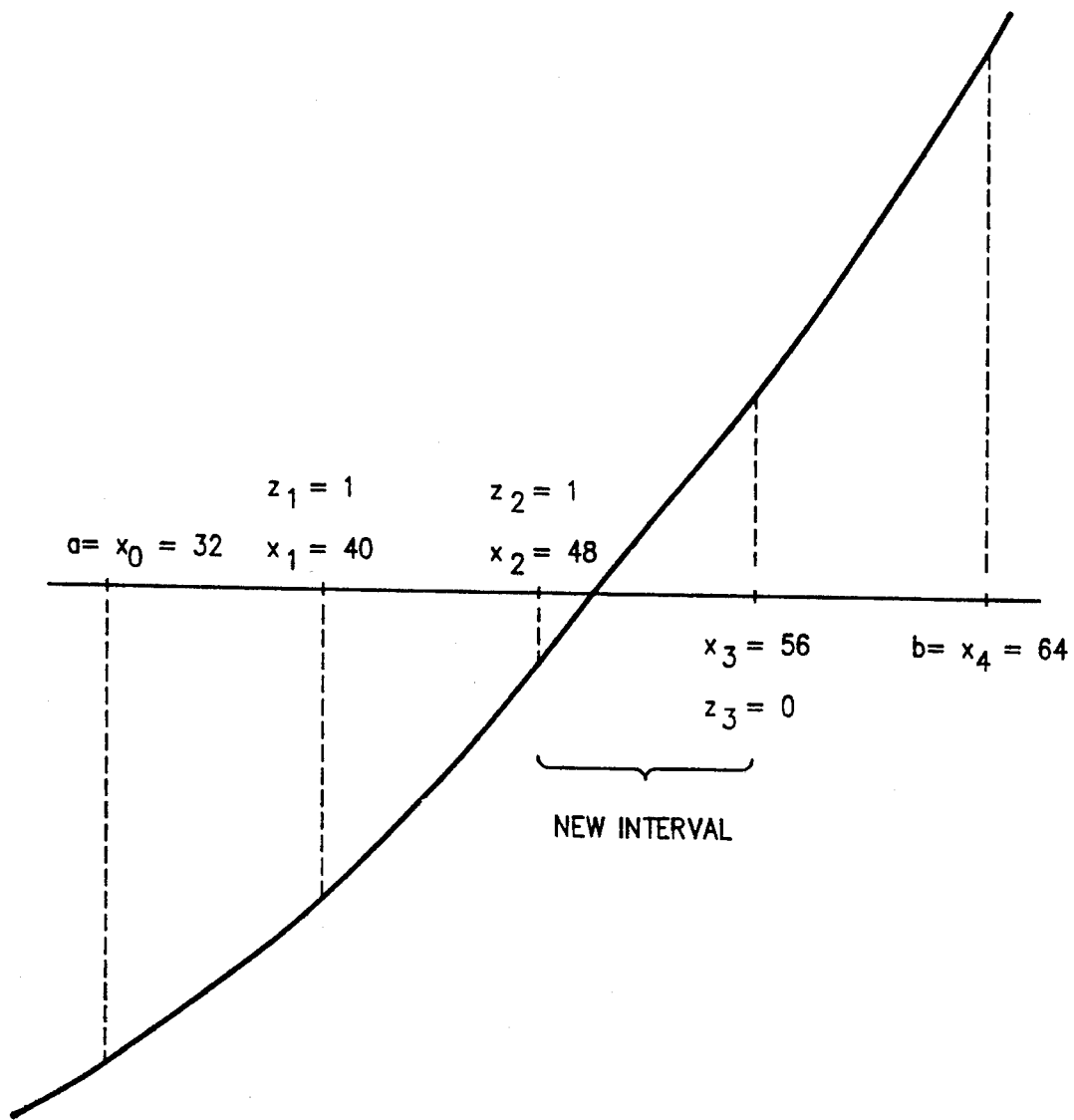
FIG. 5 is a graphic example illustrating one iteration of the claimed method when applied to solve the problem of finding the zero of an increasing function.

The first iteration of the method is illustrated in FIG. 5. The initial values of a and b are <01><00000>=32 and <10><00000>=64, respectively. During the first iteration three evaluations are performed in parallel at $x_1=40=$<01><01><000>, $x_2=48=$<01><10><000>, and $x_3=56=$<01><11><000>.

The function f(x) is negative at 40 and 48 and positive at 56. Therefore, $z_1=1$, $z_2=1$ and $z_3=0$, and the sequence of bits z built is 110. When searching for the position of the pattern 10 in the sequence of bits we find that s=2, which in binary form is 10. Thus, the next 2 bits to add to a will be <10>, and the value of a changes from <01><00000>=32 to <01><10><000>=48.

Furthermore, the current search interval shrinks to $|48,56)$ which is $2^r=4$ times smaller than the initial search interval. Note that this method reduces the search interval at each iteration much faster than the methods of the prior art.

In the second iteration three evaluations are concurrently performed at $x_1=50=$<0110><01><0>, $x_2=52=$<0110><10><0>, and $x_3=54=$<0110><11><0>.

The sequence z=100 is built and the pattern 10 is searched. The index identified is s=1. The following two bits to add to a are <01> and a changes from <01><10><000>=48 to <0110><01><0>=50 while the current search interval shrinks to $|50, 52)$.

In the final iteration, only one evaluation at 51 is performed to update the least significant bit of a, and the result is 0. The value of a is kept unchanged and the search interval is updated to $|50,51)$.

Since the length of the current interval is 1 no further iterations need to be performed, and the final solution is 50.

The problem of finding a fixed point of a function

The solution for the fixed point problem is given by the point x* within the domain that satisfies the condition f(x)=x of a given function f(x).

This problem can be solved by convening the function f(x) into a second function g(x)=f(x)−x and solving the zero finding problem for g(x). Note that, when g(x) is equal to zero, f(x)=(x) and the above condition for the fixed point problem is satisfied.

The problem of finding a minimum/maximum of a convex/concave function

The development of the present method applied to solve this specific problem is based on the Mean Value Theorem $$\frac{f(b)-f(a)}{b-a}=f'(\xi), \xi\in[a,b].$$

The theorem is applied iteratively by updating extreme and middle points of the search interval whereby the middle point simulates the minimum/maximum of the function.

Assuming that the function f(x) is convex, only one minimum is present in the search interval. Let the criteria for evaluation be such that a binary 1 is added to the sequence of bits z whenever the difference of the values of the function at two consecutive points is non positive, and a binary 0 is added otherwise. The bit pattern pat is 110 and the sequence of bits z is a sub-sequence of ones followed by a sub-sequence of zeros. The case of a concave function is handled symmetrically.

Since |pat|=3 and |pat|−1=2 is a power of 2, v is equal to 1, and the number of macro intervals is 2.

The value of r is chosen such that the number of processing elements N is greater or equal to $2^{r+1}-1$, which will be the number of internal points selected. It is also assumed in this case that r is a factor of m and kept constant. The current search interval is then divided into 2 macro-interval, and each macro-interval is further divided into $2^r$ sub-intervals.

Next, $2^{r+1}3-1$ processing elements evaluate in parallel the function f(x) at corresponding internal points $x_i$ according to the criteria described above, i.e., the result of each evaluation is a binary digit $z_i$, such that, $z_i=(f(x_i)-f(x_{i-1})\leq 0)$, $1\leq i\leq N$, where $z_i$ is 1 if the above logic expression is true, and it is 0 if the expression is false.

The bit pattern 110 is searched within the sequence of bits z. The initial and final positions of bit pattern pat within said sequence of bits z are computed as $$s=\sum_{i=1}^{N} z_i -1 \text{ and } s'=s+2$$

respectively.

The interval shrinks $2^r$ times. The new interval boundaries and middle point are updated, such that, $a=x_s$, $c_1=x_{s+1}$, and $b=x_{s+2}$.

While the updated search interval is greater than $\epsilon=2^v=2^1=2$, the search interval is divided into 2 macro-intervals and each macro-interval is further divided into $2^r$ sub-intervals, and the whole process is repeated. As seen above, when the size of the updated search interval is reduced to 2, the final solution is given by $c_1$.

Figure 6:
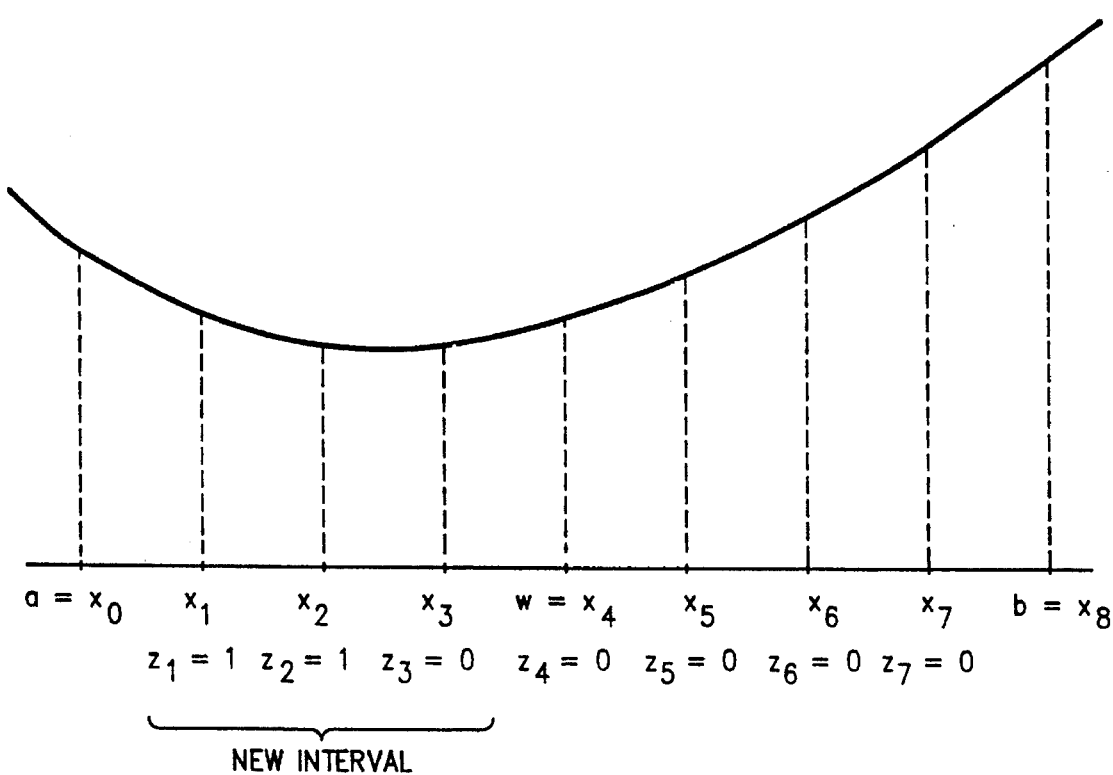
FIG. 6 is a graphic example illustrating the first iteration of the claimed method when applied to solve the problem of finding the minimum of a concave function.

A graphic example of an iteration is illustrated in FIG. 6

The problem of finding the saddle point of a function.

The development of the present method applied to solve this specific problem is based on the approximation of the second derivative with finite differences, which is achieved by calculating the differences among three consecutive function evaluations $$f'(x_i) = \frac{f(x_{i+1}) - 2f(x_i) + f(x_{i-1})}{2}$$

A given point x is a saddle point if f'(x)=0. By observing above mentioned formula, in the context of finite differences, we see that $x_i$ is a candidate for a saddle point if $$f(x_{i+1}) - f(x_i) = f(x_i) - f(x_{i-1})$$

Figure 7:
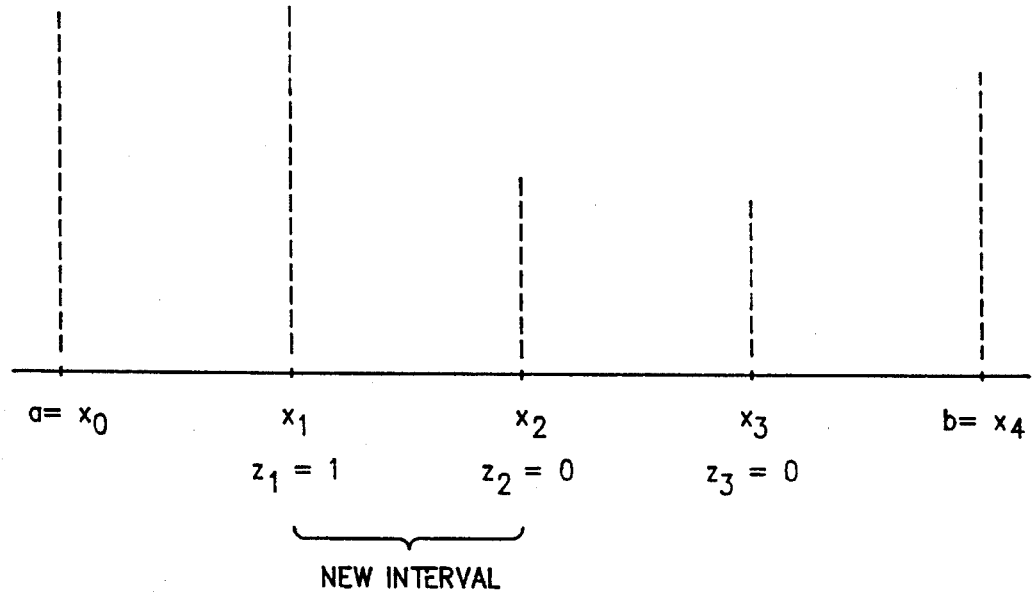
FIG. 7 is a graphic example illustrating the first iteration of the claimed method when applied to solve the problem of finding the saddle point of a convex/concave function.

Let us consider the case when a given function f(x) is first concave and then convex as illustrated in FIG. 7. Applying above mentioned approximation at a given point $x_i$, the first difference is calculated between the values of the function f(x) at the point $x_i$ and its subsequent point $x_{i+1}$. The second difference is calculated between the values of the function f(x) at the point $x_i$ and its precedent point $x_{x-1}$. The values of these differences will indicate whether the function is increasing or decreasing at a corresponding point $x_i$. Thus, the saddle point will be located within first sub-interval where the first difference is no longer smaller than or equal to the second difference.

Let the criteria for evaluation be such that a binary 1 is added to the sequence of bits z if the difference of the values of said first difference and said second difference is non positive, and a binary 0 is added otherwise. We observe that the saddle point is located within the interval defined by the two consecutive points corresponding to the subsequence formed by a binary 1 followed by a binary 0. Thus pat=10. The case where the function f(x) is first convex than concave is handled symmetrically.

Since |pat|=2, and |pat|−1=1 is a power of 2, then v is equal to 0. The only one macro-interval is selected as the initial search interval, where $a=c_0$ and $b=c_1$. The value of r is chosen such that the number of processing elements N is greater than or equal to $2^r-1$, which will be the number of internal points selected. It is also assumed in this case that r is a factor of m and kept constant along the iterations.

The current search interval is then divided into $2^r$ sub-intervals by selecting $2^r-1$ internal points $x_i$, $1 \leq i \leq 2^r-1$.

Next, $2^r-1$ processing elements evaluate in parallel the function f(x) at corresponding internal points $x_i$, according to the criteria described above, i.e., the result of said evaluations is a binary digit $z_i$, such that, $$z_i = (f(x_{i+1}) - f(x_i) \leq f(x_{i-1})), 1 \leq i \leq N,$$

where $z_i$ is 1 if the above logic expression is true, and it is 0 if the expression is false.

The sequence of $2^r-1$ bits corresponding to the results of the evaluations is built, and the bit pattern 10 is searched within the sequence z. The initial and final positions of the bit pattern are computed as $$s = \sum_{i=1}^{N} z_i \text{ and } s' = s + 1,$$

respectively.

The interval shrinks $2^r$ times and the new interval boundaries are updated, such that, $$a=x_s \text{ and } b=x_{s+1}.$$

At the end of an iteration, the following r bits of the solution are computed.

The stopping criterion ε is equal to $2^v=2^0=1$; i.e., there will be only one integer inside the interval |a,b) when the size of same is reduced to 1. The final value of a is chosen as the solution x* and b can be referred as the upper bound solution.

While the updated search interval is greater than 1, referred search interval is divided into $2^r$ sub-intervals and the whole process is repeated. As seen above, when the updated search interval is reduced to size 1, the final solution will be a. A graphic example of an iteration is given in FIG. 7.

The problem of finding all the critical points of a function

The previous four applications can be concurrently applied on the same function and interval in order to find all the critical points (zeros, minima, maxima. etc. . . ) of the function at once. This adds great power to the method as a practical tool to analyze functions in a given interval.

No important changes have to be performed in the apparatuses that implement previous applications, since evaluations are very similar and searching for the position of different patterns in the strings of bits $z_i$'s can be performed in parallel.

Apparatus for Solving Numerical Problems

Figure 8:
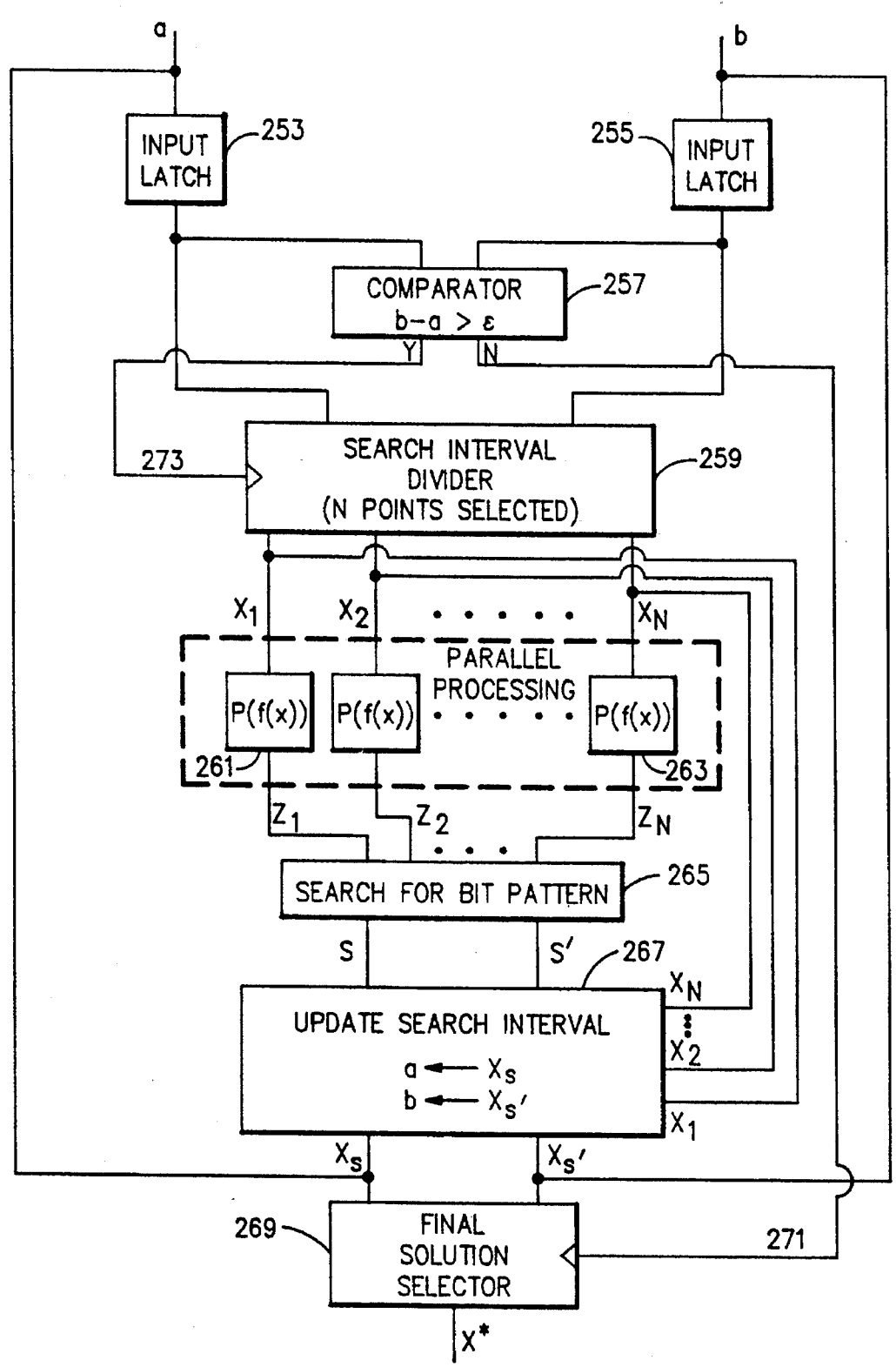
FIG. 8 is a block diagram illustrating the claimed apparatus.

Following is a description of the general apparatus that implements the method of the present invention which is illustrated in FIG. 8.

As previously mentioned, the initial search interval, as well as other problem dependent parameters, is defined according to the problem being solved and must be provided to the apparatus. Thus, the initial search interval boundaries a and b are provided to input latches 253 and 255, respectively. Comparator circuit 257 compares the length of the current search interval to the stopping criterion ε, inherent to a specific apparatus. If referred interval is greater than ε, line 273 activates division circuit 259 that divides the current search interval by selecting N points. Each of the N points selected is an input to a corresponding processing element 261, 263, such that N evaluations are performed in parallel. The results $z_i$ of these evaluations are inputs to a sequential circuit 265 that searches for bit pattern pat. The outputs of search circuit 265 are s and s', which correspond to the initial and final position of pat in the sequence of bits z. These indexes are inputs to selector circuit 267 which selects corresponding points $x_s$ and $x_{s'}$ and updates the search interval by substituting the values of a and b by $x_s$ and $x_{s'}$ respectively. The new search interval boundaries are fed back to input latches 253 and 255, and also to final solution selector circuit 269. When starting the next iteration, if line 271 indicates that the stopping condition is satisfied, selector circuit 269 selects a point from the current interval and outputs it as the final solution x*, otherwise the apparatus performs further iterations until the length of the new search interval is less than or equal to ε.

Figure 9:
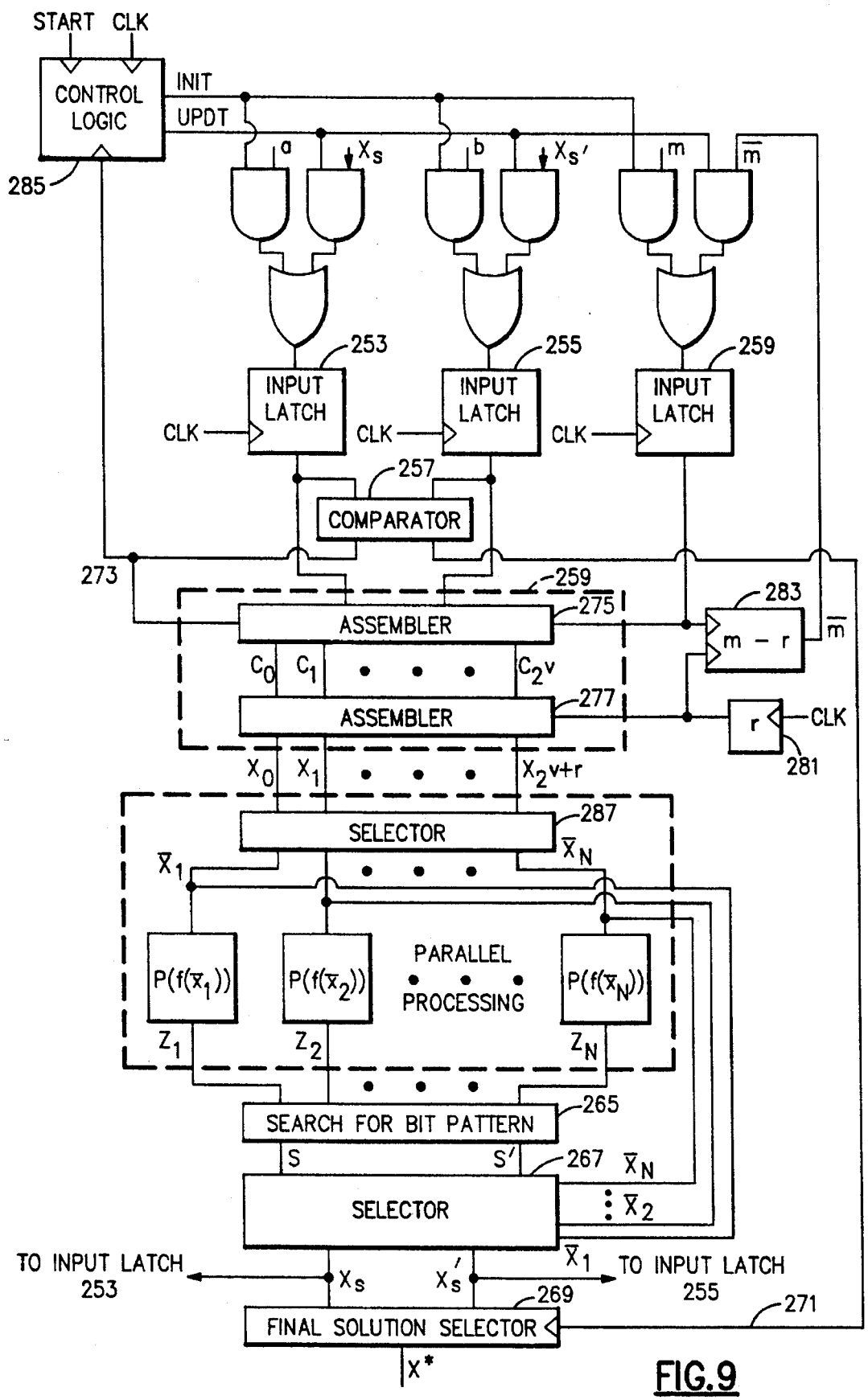
FIG. 9 is a block diagram illustrating the claimed apparatus when used in digital computers to solve numerical problems over a floating point domain.

Referring to FIG. 9, it is illustrated an apparatus that implements the present invention when applied in digital computers to solve numerical problems over a floating point domain. Likewise the general apparatus described above is related to the general method, the apparatus illustrated in FIG. 9 is related to the steps of the claimed method when used in digital computers to solve numerical problems over a floating point domain. In this connection, the following description can be easily understood if we refer to the previous development of the method for solving numerical problems over a floating point domain, whereby the search interval is first divided into equally spaced macro-intervals and then each macro-interval is divided into sub-intervals.

Accordingly, the stopping criterion is equal to $2^v$. Division circuit 259 is formed by two circuits, whereby first circuit 275 selects $2^v+1$ equally spaced points $c_j$'s in the search interval, dividing the search interval into $2^v$ macro-intervals, while second circuit 277 selects $2^{v+r}+1$ equally spaced points, including the points $c_j$'s, dividing each macro-interval into $2^r$ sub-intervals. Considering the binary numbers are represented with t bits and that each macro-interval contains $2^m$ internal points, circuit 275 is implemented as a series of $2^v+1$ assemblers that build binary numbers $c_j$'s by adding a sequence of a zeros ($<0>_m$) to the left of sequential binary numbers represented with t–m bits, whereby the difference between two consecutive of referred sequential binary numbers is 1. Additionally, the outputs of the first and last assemblers are equal to the search interval boundaries a and b, respectively. In the same fashion, circuit 277 constitutes a series of groups of $2^r+1$ assemblers that build binary numbers by adding a sequence of m–r zeros ($<0>_{m-r}$) to the left of sequential binary numbers represented with t+r–m, whereby the difference between two consecutive of referred sequential binary numbers is 1. Additionally, the outputs of the first and last assemblers of referred group are equal to two consecutive points $c_j$'s.

To assure correct assembling of desired binary numbers, which varies at each iteration, the value of m is provided to assembling circuit 275 by input latch 279, while generator 281 provides the value of r to assembling circuit 277. Remember that at each iteration r bits of the solution are provided, and for that reason m is decreased by r at each iteration. Block 283 provides the decreased value of m which is fed back to input latch 279. A set of 2 AND gates connected to an OR gate with the aid of control lines init and updt, provided by control logic 285, assure correct inputs to input latches 253, 255 and 279. If the apparatus is performing the first iteration control line init is active and the inputs will be initial search interval boundaries a and b and initial value of m. When a subsequent iteration is being performed, control line updt is active and the inputs will be $x_s$, $x_{s'}$ and decreased value of m (m), respectively.

Considering that the search interval is divided such that the number of processing elements is greater than or equal to the number of internal points, not all assembled numbers will be necessarily evaluated. Therefore, prior to parallel evaluations, N of the $2^{v+r}+1$ points assembled are selected for function evaluation in selector circuit 287. This selection might not include, for example, the extreme points, if N is equal to the number of internal points.

Selector circuit 267 uses the indexes s and s' to select corresponding points $x_s$ and $x_{s'}$, which are then fed back to input latches 253 and 255 subject to control line updt, as described above. Sequential circuit 265 and selector circuit 269 are the same as described previously for the general apparatus.

Calculation of the square root of a floating point number.

Development of the current application is made separately from the others since it is given a more detailed description.

This application shows how the method is useful for the design and implementation of specific hardware based solutions. Following is a hardware oriented development of the current application of the method where a specific corresponding apparatus is provided, more specifically, an apparatus for the computation of square root of a floating point number.

The square root function will be implemented as a special case of a zero finding problem since $\sqrt{x}$ is the zero of the function $f(y)=y^2-x$, in the interval $x \geq 0$. For instance, the square root of 2500 is the zero of the function $f(y)=y^2-2500$, which is 50. Similarly to the other applications, a group of bits of the solution (square root) is provided at each iteration of the method.

Keeping that in mind, the current development to solve the square root problem combines three different versions of the claimed method. Initially, it is applied a first version of the claimed method to provide the p most significant bits of the solution in only one iteration. This first version is referred as the straightforward parallel version. Next, it is applied a second version that uses as input the previous partial result. The next q×r intermediate bits of the solution are provided in $q \geq 0$ iterations, each iteration adding $r \geq 1$ bits to the partial solution. This second version is referred as the iterative parallel version. A last version is applied to provide the least significant bits of the solution. This third version is referred as the sequential version, and it provides one bit at each iteration (r=1). The sequential version is based on well known methods for the computation of the square root (see Flores, I.; The Logic of Computer Arithmetic, Englewood Cliff, N.J., Prentice Hall, 1963). However, in the current development it consists a special case of a more general parallel computation.

The values selected for p, q and r will depend on the circuit packing density, the number of bits of the binary representation of the solution, and trade-offs between the iterative parallel and the sequential versions. Higher packing densities will increase p, while longer number representations and faster circuit response time will increase q and r. These features allows design configurabity, that is, implementations can be adapted to specific conditions in order to obtain the best possible speed-up gain, which is one of the most important objects of the present invention. Further considerations on time and space trade-offs will be discussed later in this document.

Development of the current application is based on the IEEE 754-1985 standard for single precision floating point representation. This representation is used, for example, in the IBM PS/2 and RISC/6000 systems. The square root apparatus can be easily adapted to other floating point representation standards. For purposes of orientation, following is a description of said standard.

To simplify the description, the value of a given variable will be represented without distinction in decimal or binary form depending on the context it is used. Distinction between the two formats for the same variable will be made only when necessary.

When a given number x is expressed in binary form, the notation $x_{n..m}$ is used to denote the sub-sequence of bits defined between position m and position n of x. This notation will be commonly used in the present application, specially to express numbers formed by concatenation of at least two sub-sequence of bits. The least significant bit position is 0, and the bit in this position is represented by $x_0$. A simple combinatorial circuit implements the most significant bit position function (msb(x)).

The standard IEEE 754-1985 represents floating point numbers with 32 bits such that for any number x mantissa_sign=$x_{31}$, exponent=$x_{30..23}$, and mantissa=$x_{22..0}$. The binary representation is given by:

$$x = <x_{31}><x_{30..23}><x_{22..0}> = <\text{mantissa\_sign}><\text{exponent}><\text{mantissa}>$$

The decimal value of x according to the IEEE 754-1985 standard is given by:

$x = 2^{exponent-127} \times (1+\text{mantissa} \times 2^{-23})$, when $0 < \text{exponent} \leq 255$;

$x = 2^{-126} \times \text{mantissa} \times 2^{-23}$, when exponent=0 and mantissa $\neq 0$; and x=0, when exponent=0 and mantissa=0.

Furthermore, since the argument of the square root function must be non negative, $x_{31}$=mantissasign=0. Note that an implicit bit 1 is concatenated to the mantissa in the case when exponent>0.

Based on the above representation we will denote the solution $\sqrt{x}$ as the bit concatenation of signroot, rootexp, and rootman using the standard representation format, $$\sqrt{x} = \text{<signroot><rootexp><rootman>},$$

where signroot is 0, since a square root must be non negative.

Independently of the standard representation the square root is trivially 0 when x=0. To calculate the square root of a floating point number x represented in the IEEE 754-1985 standard format, and x>0, two cases must be considered: when exponent is zero and when exponent is positive. When x>0 and exponent=0, the most significant bits of the mantissa may be zeros, and the mantissa can be shifted to the left until the most significant bit reaches bit position 23, while exponent of x is decremented accordingly. Note that the exponent value of the shifted mantissa cannot be represented by referred standard, however, it can be handled internally by the claimed apparatus, as it will be seen. This process will now be referred as normalization, and the new normalized mantissa will be represented as norman. The exponent, which in this case was initially 0, turns equal to—No of shifts. Considering IEEE standard for the case when exponent=0 the exponent of 2 becomes—No of shifts—126. Since the normalized mantissa has a binary 1 in bit position 23 it can now be represented as the case when 0<exponent≤255, and the exponent of 2 becomes—No of shifts+1—127 or simply norexp—127, where norexp=—No of shifts+1.

For example, if $$x = \text{<0><0000000><00011001011100100101011>}$$

the mantissa is shifted 4 positions to the left to have a binary 1 in bit position 23. Accordingly, the exponent is decreased by 4. Thus, norexp=−3 and the normalized value of x is:

$$x = 2^{-3-127}(1 + 10010111001001010111 \times 2^{-23}).$$

Note that the normalized number has the format $2^{norexp-127}(1+\text{norman} \times 2^{-23})$, where, $-22 \le \text{norexp} \le 0$ and $0 \le \text{norman} \times 2^{-23} < 1$. Also, $\text{norman} \times 2^{-23} = 0$ corresponds to the extreme case when the most significant bit position of the mantissa, denoted by msb(mantissa), is equal to zero, that is, all bits are zero except for the least significant bit. In this case 23 shifts are needed to normalize the mantissa, therefore, norexp=−22. The other extreme case is when there is a binary 1 in bit position 22, i.e., msb(mantissa)=22. In this case only one shift is needed to normalize the mantissa, therefore, norexp=0. Additionally, it can be verified that −No of shifts+1 is the same as −22+msb(mantissa), where msb(mantissa) is the most significant bit position of the mantissa.

Considering the case when x≠0 and exponent >0, IEEE standard representation used is that cited above for 0<exponent≤255. In this representation there is an implicit binary 1 in bit position $x_{23}$ which means the mantissa is already normalized, therefore, norexp=exponent. Hence, the normalized number format valid for both cases, when exponent is equal to zero and when it is greater than zero, is:

$$x = 2^{norexp-127}(1+\text{norman} \times 2^{-23}) \text{ where } -22 \le \text{norexp} \le 255 \text{ and } 0 \le \text{norman} \times 2^{-23} < 1.$$

norman=mantissa.

Considering the above format, the square root of a normalized number is then:

$$\sqrt{2^{norexp-27}(1 + \text{norman} \times 2^{-23})} =$$

$$2^{((norexp-127)/2+127)-127}\sqrt{2^{(norexp-127) \bmod 2}(1 + \text{norman} \times 2^{-23})} =$$

$$2^{(norexp+127)/2-127}\sqrt{2^{(norexp-127) \bmod 2}(1 + \text{norman} \times 2^{-23})} =$$

$$2^{rootexp-127}\sqrt{k(1 + \text{norman} \times 2^{-23})}$$

where /is an integer division, and mod is the remainder of the division.

As seen in the last expression of the equality above, if we make $$\text{rootexp} = (\text{norexp} + 127)/2, \text{ and}$$
$$k = 2^{(norexp-127) \bmod 2}$$

we reduce the value of the square root of a normalized number to a format very similar to the IEEE 745-1985 standard representation for a number x>0, with 0<exponent≤255. Thus, rootexp is the exponent of the square root of x.

Additionally, k is referred as the mantissa correcting factor. Since the reminder of an integer division is either 1 or 0, the only possible values for k are 1 or 2. When calculating the value of rootexp we have the following two possibilities:

if exponent=0, norexp=−22+msb(mantissa); and $$\text{rootexp}=(-22+\text{mbsp(mantissa)}+127)/2=(105+\text{msb(mantissa)})/2 ;$$

if exponent>0, norexp=exponent and $$\text{rootexp}=(\text{exponent}+127)/2.$$

When analyzing the mantissa correcting factor k, the value of norexp is also substituted by −22+msb(mantissa), and we see that:
when exponent=0, i.e., normalization is needed, $$k = 2^{(norexp-127) \bmod 2} = 2^{(-22+\text{msb}(mantissa)-127) \bmod 2}$$
$$= 2^{(-149+\text{msb}(mantissa)) \bmod 2}$$
$$= 2^{(\text{msd}(mantissa)+1) \bmod 2}$$
$$= 2^{\neg(\text{msd}(mantissa))_0};$$

where $(\text{msb}(mantissa))_0$ is the least significant bit of the binary representation of the most significant bit position of the mantissa, and the sign $\neg$ before the expression is the logical negator, i.e., it gives the opposite bit.
when exponent>0, i.e., the number is already normalized $$k = 2^{(norexp-127) \bmod 2} = 2^{(exponent-127) \bmod 2}$$
$$= 2^{(exponent+1) \bmod 2}$$
$$= 2^{\neg exponent_0}.$$

Similarly, $\text{exponent}_0$ is the least significant bit of the exponent expressed in binary form.

Figure 12:
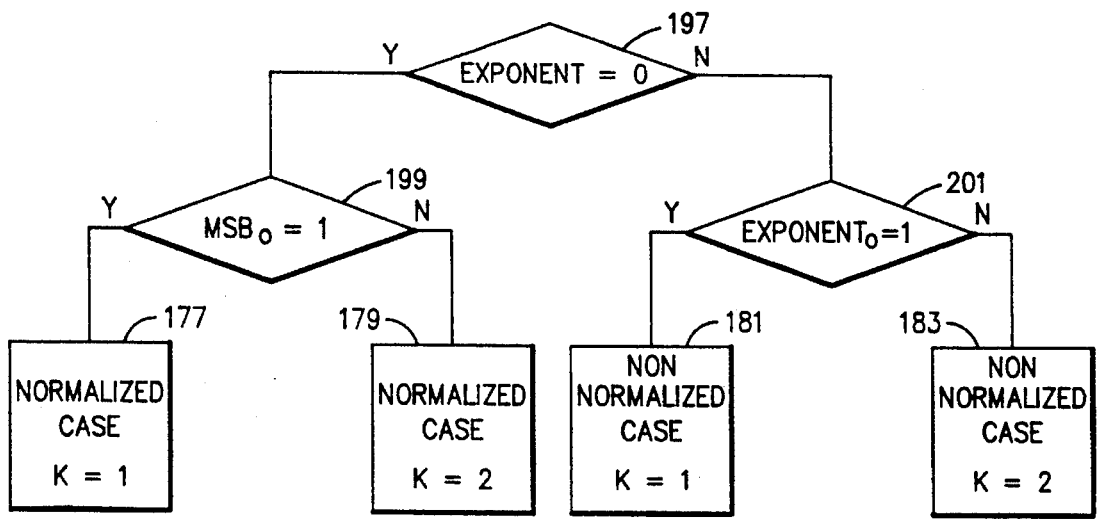
FIG. 12 shows the flow chart related to the circuit illustrated in FIG. 11 that outputs the value of norman.

The four possible cases described above when analyzing the mantissa correcting factor are diagrammatically shown in the flow chart of FIG. 12.

Finally, we know that $1 \leq (1+\text{norman} \times 2^{-23}) \leq 2$, and since k is equal to 1 or 2, we have:

$$1 \leq k(1 + \text{norman} \times 2^{-23}) < 4;$$

thus, $$1 \leq \sqrt{k(1 + \text{norman} \times 2^{-23})} < 2;$$

which means that the square root above can be represented in the IEEE 754-1985 standard format, i.e., $$\sqrt{k(1 + \text{norman} \times 2^{-23})} = 1 + \text{rootman} \times 2^{-23}$$

Considering the whole argument of the square root function, we see that the square root of the normalized number x is also a normalized number, and is equal to:

$$\sqrt{x} = 2^{\text{rootexp}-127}(1 + \text{rootman} \times 2^{-23}).$$

Figure 10:
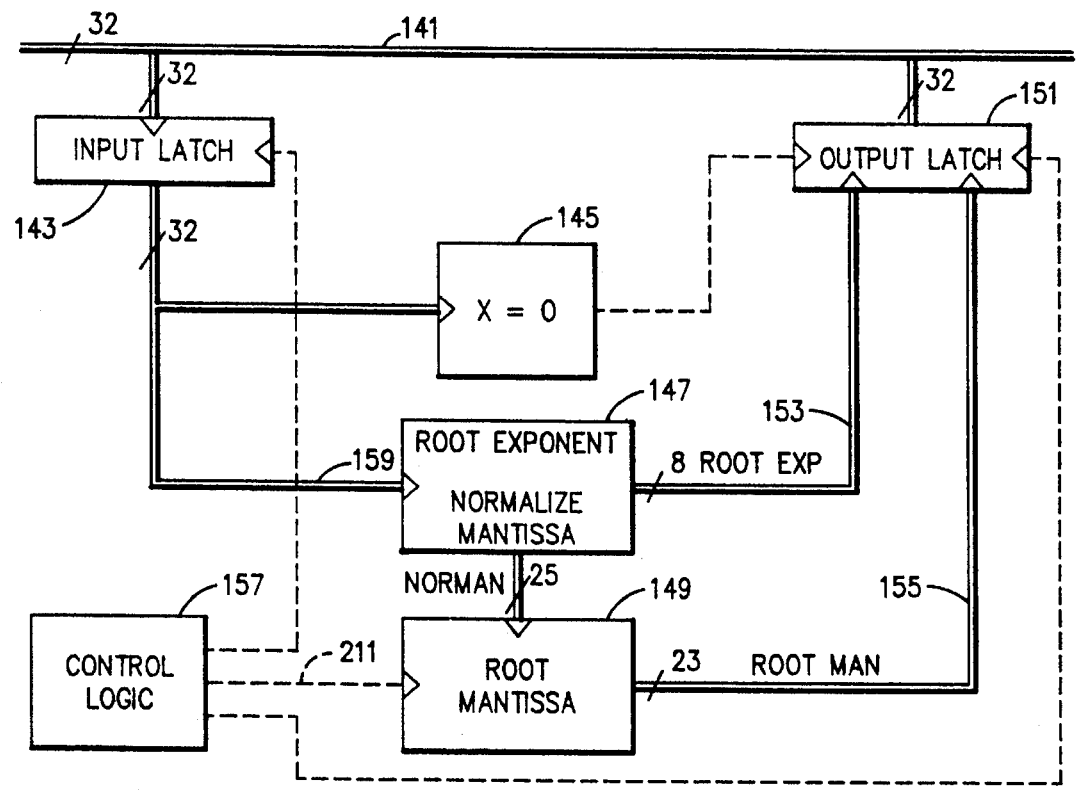
FIG. 10 shows a first level block diagram of the apparatus for computation of the square root of a floating point number.

FIG. 10 shows a first level block diagram of the apparatus for computation of the square root of a floating point number. The argument x, expressed in binary form as $$x=<x_{31}><x_{30..23}><x_{22..0}>=<\text{mantissa\_sign}><\text{exponent}><\text{mantissa}>$$

is loaded from the 32 bit data bus 141 to an internal 32 bit input register 143. Two combinatorial circuits represented as blocks 145 and 147 operate in parallel. Block 145 evaluate whether the argument x is zero and if so it resets output latch 151 to issue the trivial result zero. At the same time, block 147 computes rootman, the exponent of the solution, and norman, the normalized mantissa of the argument Thus, the computation of the exponent of the solution and the normalization of the argument mantissa are interrelated and performed concurrently.

Block 149 uses the value of norman to compute the mantissa of the solution rootman. Busses 153 with 8 bits and 155 with 23 bits connect the outputs rootexp and rootman of blocks 147 and 149, respectively, to output latch 151, which in turn outputs the 32 bit solution, square root of x, as the bit concatenation of signroot, rootexp, and rootman. Control logic 157 synchronize input, combinatorial delay, computation of the mantissa of the solution, and output.

Figure 11:
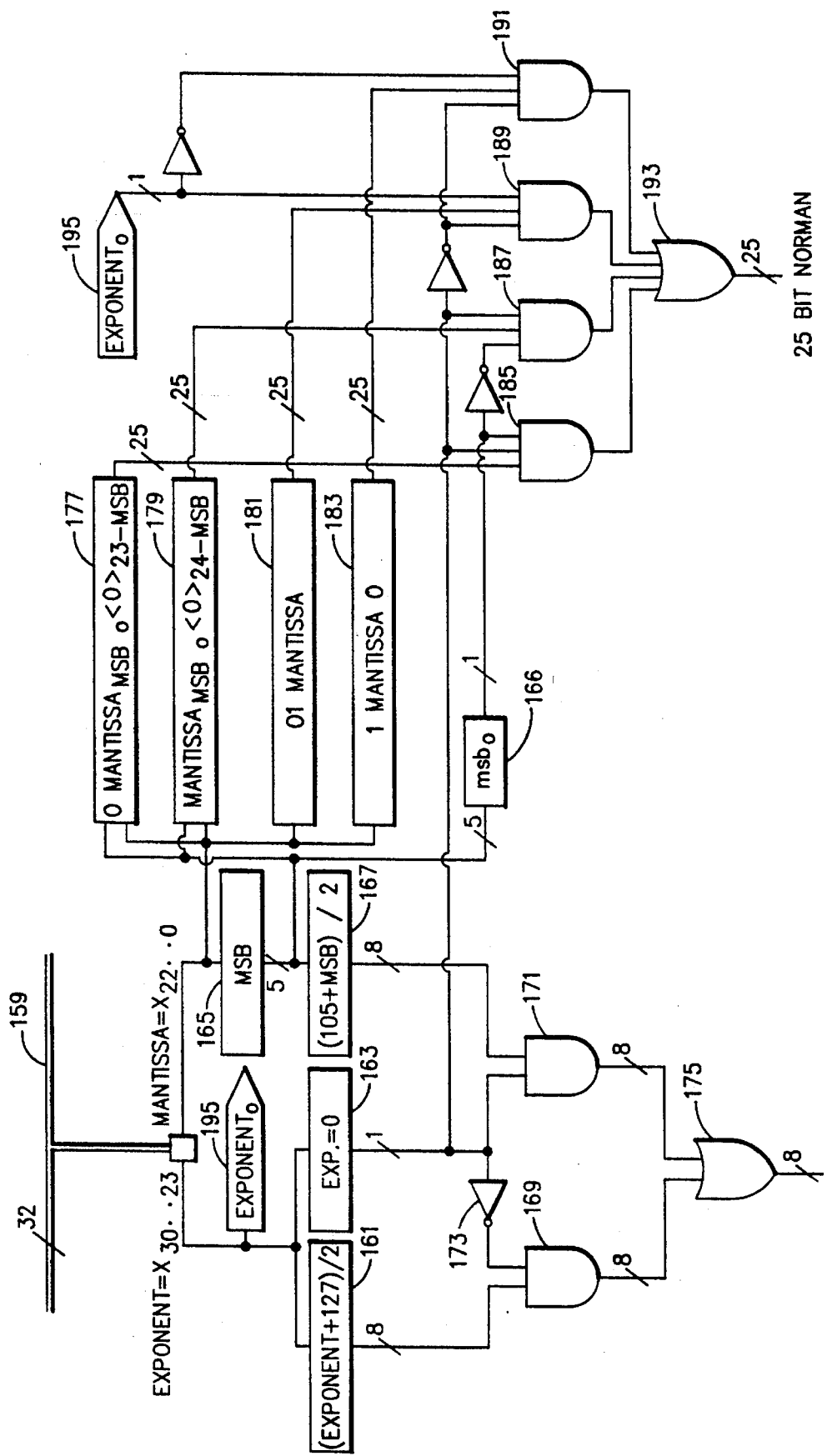
FIG. 11 shows in details the circuit that implements the functions of block 147 illustrated in FIG. 10.

FIG. 11 shows in details the circuit that implements the functions of block 147. It is a combinatorial circuit based on the development of the square root of a floating point number represented in the IEEE 754-1985 standard format described in the previous pages. It outputs the values of rootexp and norman by considering the two possibilities, exponet=0 and exponent>0, and when considering a value for norman it also evaluates the mantissa correcting factor k.

Bits corresponding to the exponent of the argument $(x_{30..23})$ are selected from the 32 bit bus 159 and provided to blocks blocks 161 and 163. Block 161 outputs the value of rootexp corresponding to the case when exponent>0, and block 163 verifies whether or not exponent=0. Bits corresponding to the mantissa of the argument $(x_{22..0})$ are selected from the 32 bit bus 159 and provided to block 165. Block 165 is a combinatorial circuit that issues the most significant bit position of the 23 bit mantissa, now referred as msb. A simple combinatorial circuit, well known to those skilled in the art, implements the most significant bit position function. The value of msb serves as input to block 167 that outputs the value of rootexp for the case when exponent=0. The set of gates 169, 171, 173 and 175 will select one of the two possible solutions for rootexp taking into account the output of comparator block 163 that determines whether or not exponent=0.

The rest of the circuit shown in FIG. 11 is responsible for outputting a sequence of 25 bits corresponding to the expression $k(1+\text{norman}) \times 2^{-23}$. For purposes of simplification, this output will now be referred simply as noonan. As seen in the previous development of the square root of a floating point number, the value of above expression will first depend whether exponent=0 or not, and then it depends whether k=1 or k=2. For the case when exponent=0, the number needs to be normalized, and the mantissa correcting factor k is equal to 1 if $(\text{msb}(\text{mantissa}))_0=1$ and is equal to 2 otherwise. For the case when exponent>0, the number does not need normalization, and k is equal to 1 if exponento=1 and it is equal to 2 otherwise. The four possibilities described above can be clearly seen in the flow chart of FIG. 12. Note that each of the end of line blocks in FIG. 12 have the same number as its corresponding block in FIG. 11.

Blocks 177, 179, 181, and 183 also have the bits corresponding to the mantissa of the argument, mantissa, as input, and each of them build the output norman by concatenating bits to the left and/or to the right of a sequence of bits selected from mantissa Blocks 177 and 179 perform normalization and for that reason they also need msb as input. Note that a sequence of zeros is added to the right of the sequence of bits selected from mantissa (mantissa$_{msb..0}$). Block 179 corresponds to the case when k=2, thus one more zero is added to the right since multiplying by 2 is equivalent to shifting the binary number one position to the left. Blocks 181 and 183 do not perform normalization since exponet>0. Moreover, because of the IEEE representation format a binary I is added to the left of mantissa. Similarly to block 179, block 183 adds one zero to the right of mantissa. Block 166 outputs the least significant bit of the 5 bit input corresponding to the most significant bit of the mantissa expressed in binary form. Combinatorial circuits represented as AND gates 185, 187, 189, and 191 receive the 25 bit output of blocks 177, 179, 181, and 183, respectively. Only one of the outputs of said AND gates is other than zero and it is also the output of OR gate 193. Selection of one of the four 25 bit sequences is made by taking into account the outputs of blocks 163, 165, and 195, which correspond, respectively, to decision blocks 197, 199, and 201 shown in FIG. 12.

Figure 13:
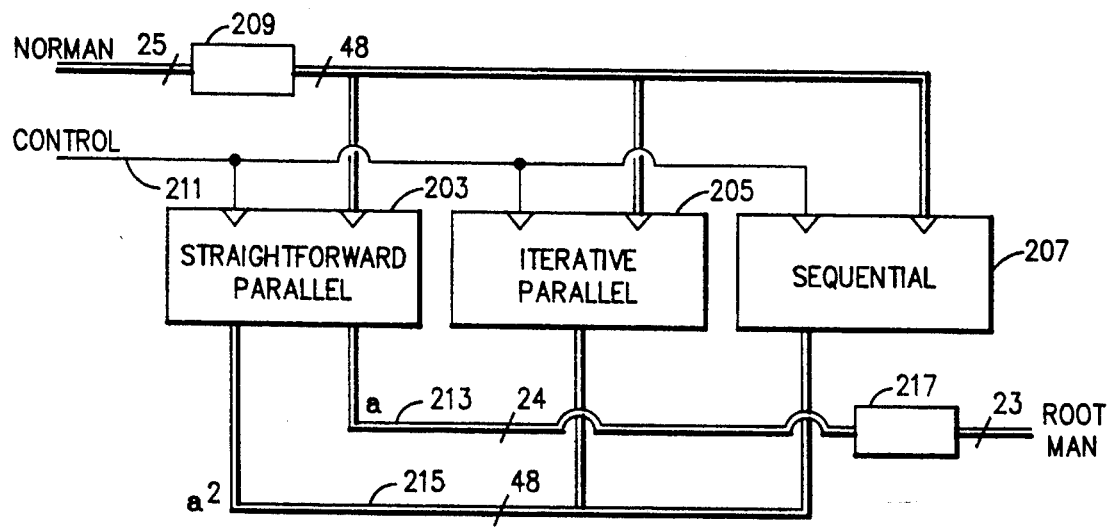
FIG. 13 is a block diagram of the circuit that implements the square root of the normalized mantissa represented as block 149, in FIG. 10.

Referring back to FIG. 10, outputs of block 147 (circuit shown in FIG. 11) are 8 bit rootexp and the 25 bit output referred simply as norman, where norman is an input to block 149. The circuit represented in block 149 calculates the square root of the normalized mantissa. Remember that although the expression normalized mantissa is used in both cases, there is no need for normalization when exponent>0, and norman=mantissa. A block diagram of the circuit that implements the square root function is shown in FIG. 13. As previously mentioned, three versions of the claimed method are applied to perform this function. The circuits that implement the three versions, referred as straightforward parallel, iterative parallel, and sequential, are represented in blocks 203, 205 and 207, respectively. A three line control bus 211 is provided, whereby each line controls one of the three circuits that implement the three different versions of the method.

It was shown in the development described in the previous pages that the square root of $k(1+\text{norman} \times 2^{-23})$ can also be represented in the IEEE 754-1985 standard format as $1+\text{rootman} \times 2^{-23}$, i.e., as a binary number with 24 bits, 23 bits plus 1 bit omitted, according to referred standard format. Two internal data buses 213 and 215 connect blocks 203, 205, and 207 as input/output communication links. Bus 213 is a 24 bit bus that carries the current interval lower bound a, while bus 215 is a 48 bit bus that carries the square of the current interval lower bound, $a^2$. The three versions of the method are applied sequentially to the 23 bit normalized mantissa input, whereby the output of the previous method serves as an input to the following one. After the last iteration of the last version the 23 least significant bits displayed in bus 213 correspond to rootman, the mantissa of the solution. Selection of the 23 least significant bits is made by the circuit represented by block 217.

Remember that the current application (square root) is being implemented as a special case of the zero finding problem, since $\sqrt{x}$ is the zero of the function $f(y)=y^2-x$, in the interval $x \geq 0$, and the evaluation performed at each selected point is $(f(y) \leq 0)$. Since we want to compute the square root of norman, the evaluation performed at each selected point $x_i$ will be $(x_i^2-\text{norman} \leq 0)$, or simply $(x_i^2 \leq \text{norman})$. Because norman will be compared to squares represented with 48 bits it must also be represented with same number of bits. For that reason a sequence of 23 zeros is added to the right of the 25 bit norman input in block 209. Additionally, the bit pattern searched is 10, and since |pat|=2 then v=0 and the search interval has only one macro-interval limited by same boundaries. The search interval is then divided into $2^r$ sub-intervals. This is true for all versions that will be described hereinafter. Even though each of the versions has its own particularities, for example, a certain value for r, all of them are based on the steps of the general method shown in FIG. 1, except for step 101. In all three versions there is not exactly a stopping condition verified at the end of each iteration, on the contrary, the number of iterations is predefined, i.e., in each versions a specific number of iterations is performed.

Straightforward Parallel Version

This version is used to provide the p most significant bits of the solution in only one iteration. As explained before, the final solution is a normalized number of the form $1+\text{rootman} \times 2^{-23}$, and the most significant bit of the solution (bit in position 23) is 1. Thus, only p−1 bits must be found and $2^{p-1}-1$ processing elements are required. Note that in the general method we need $2^r-1$ processing elements to generate r bits of the solution in one iteration of the method.

In the next paragraphs the points $x_i$ selected within the search interval will be represented by its p most significant bits only since the least significant bits constitute a sequence of zeros. In this case r=p−1 and the search interval is divided into $2^{p-1}$ sub-intervals. Since the most significant bit is 1, partition of the search interval into equally spaced sub-intervals is done by selecting points $x_i$ defined by a bit 1 followed by a sequence of $2^{p-1}$ bits varying from $<0>_{p-1}$ to $<1>_{p-1}$, which corresponds to the index i of the corresponding processing elements expressed in binary form. Additionally, in terms of integers values we have:

$$x_i = 2^{p-1}+i,$$

where the term $2^{p-1}$ is due to the fact that the most significant bit is always 1 in the IEEE 745-1985 standard.

For example, if we have p=5

$$x_0 = 2^4 + 0 = 16 = <1><0000>$$
$$x_1 = 2^4 + 1 = 17 = <1><0001>$$
$$x_2 = 2^4 + 2 = 18 = <1><0010>$$
$$\vdots$$

$$x_{15} = 2^4 + 15 = 31 = <1><1111>$$

Considering that parallel evaluations are performed, each selected point $x_i$ is assigned to a processing element also identified by the index i, whereby the ith processing element has the constant value $x_i^2$ prestored in its circuit, $x_i^2=(2^{p-1}+i)^2$. Parallel evaluations are then performed by having the 2p most significant bits of norman compaxed to $x_i^2$ in each of the corresponding ith processing unit, such that, $$z_i = ((2^{p-1}+i)^2 \leq \text{norman}_{47..48-2p}), \text{ for } 1 \leq i \leq 2^{p-1}-1,$$

that is, z, is a binary 1 if the above logic expression is true, and it is a binary 0 otherwise.

Figure 14:
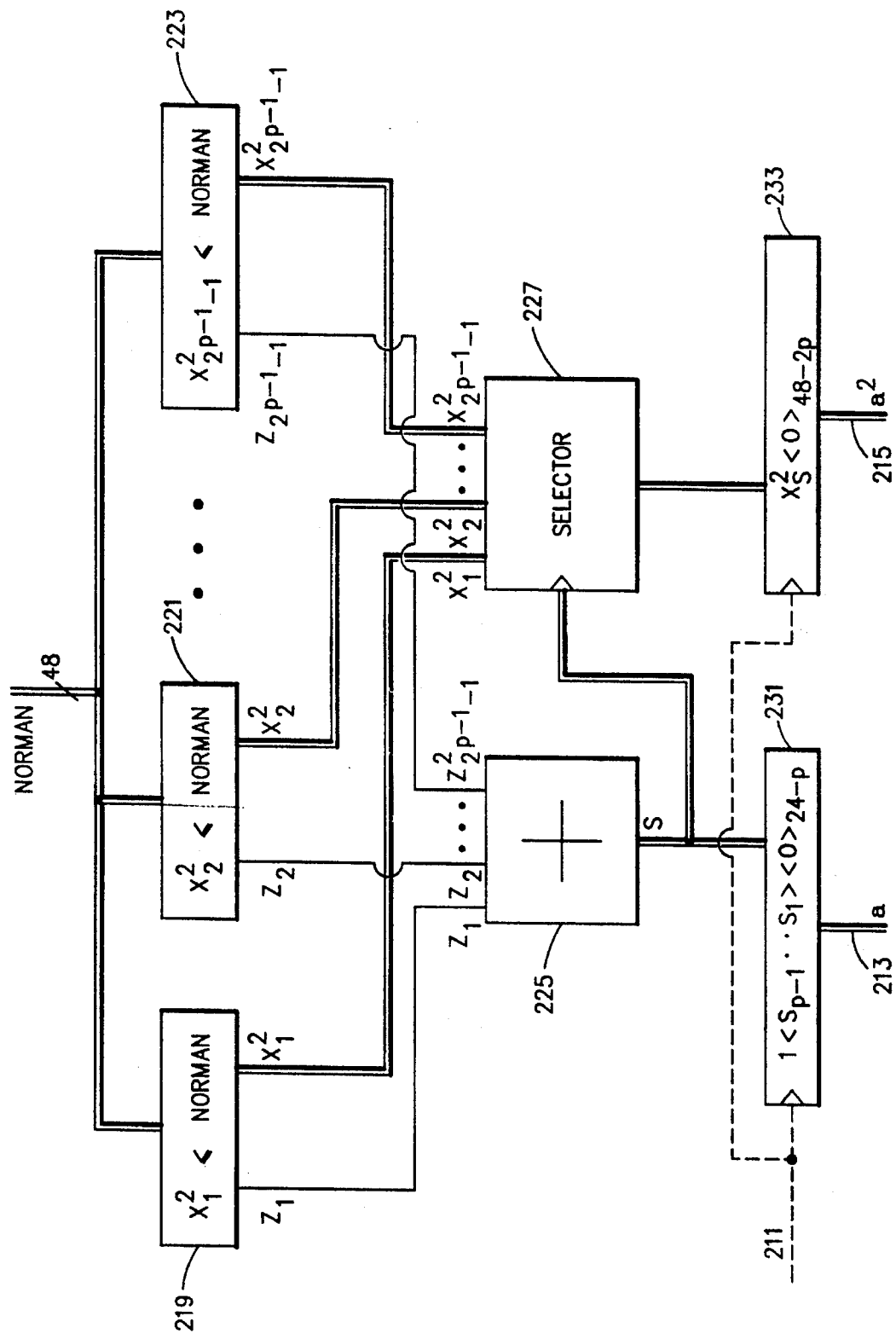
FIG. 14 is a block diagram of the circuit that implements the straightforward parallel version of the claimed method.

FIG. 14 is a schematic diagram of the circuit that implements the straightforward parallel version. Actually, the circuit shown in FIG. 14 is the basic circuit of all three versions. What varies from one version to minther is the number of processing elements and the number of iterations performed. In this case, $2^{p-1}$ processing elements are used and only one iteration is performed.

Still referring to FIG. 14, the 48 bit norman senses as input to each of the processing units 219, 221, and 223, where above mentioned evaluation is performed. Each processing unit outputs a bit $z_i$ corresponding to the result of the evaluation which together form the sequence of bits z. The bit pattern to be searched is the subsequence 10, and the initial position s of the bit pattern is computed in sum block 225 as the sum of the bits $z_i$. The output s of sum circuit 225 will be used by selector 227 to select the point $x_s^2$ corresponding to the initial position of the bit pattern. When a specific line of control bus 211 is activated, the internal data bus 213 holds the binary number $<1><s_{p-1}s_1><0>_{24-p}$ built in block 231, where $<1><s_{p-1}s \ldots s_1>$ are the p most significant bits of $x_s$; and interrod data bus 215 displays the number $(2^{p-1}+s)^2$ in binary form built in block 233 represented with 2p bits followed by the sequence of zeros $<0>_{48-2p}$.

An example with p=4 and 48 bit norman= $<10011110101100111><0>_9<0>_{23}$ is provided in the following table. In terms of integer values, norman is the number $40627 \times 2^{32}$. Only the eight most significant bits of norman and $a^2$ and, the four most significant bits of a are shown. The least significant bits omitted are sequences of 0's. Note also that $a^2 \leq \text{norman}$ is the criterion for evaluation. If p=4 then $x_i=2^3+i=8+i$, and $x_i^2=(8+i)^2$.

| i | (8 + i)**2 | norman | z | s | a | a ** 2 |
|---|---|---|---|---|---|---|
| 1 | 01010001 | 10011110 | 1 | | | |
| 2 | 01100100 | | 1 | | | |
| 3 | 01111001 | | 1 | | | |
| 4 | 10010000 | | 1 | | | |
| 5 | 10101001 | | 0 | | | |
| 6 | 11000100 | | 0 | | | |
| 7 | 11100001 | | 0 | | | |
| | | | | 100 | 1100 | 10010000 |
| | | | | | | 36864 × 2 ** 32 |

Note that in this version only one iteration is performed and p bits are computed. In the example, 4 bits (1100) were computed. Additionally, note that if p is incremented by one, the number of processing elements must double. This explains why this version although very fast is space costly.

Iterative Parallel Version

This version is used to provide the q×r bits of the solution following the p most significant bits already computed in the straightforward version. As mentioned before, the result from the previous version is used in the next version, more specifically, the initial value of the search interval lower bound a used in the iterative parallel version is the value of a found in the straightforward parallel version. Buses 213 and 215 provide the values of a and $a^2$, respectively, to the circuit that implements the current version represented as block 205 in FIG. 13.

In this version, q iterations of the claimed method are performed each one adding r bits to the solution. Since r bits are computed in one iteration, $2^r-1$ processing elements are required. Keeping in mind that all three versions are applied to solve a single problem which is the square root adapted to a zero finding problem, again, the criteria for evaluation involves the square of the selected points. Therefore, each processing element compares the square of its corresponding point and compares it to the 48 bit norman.

The search interval is divided into $2^r$ sub-intervals by selecting points $x_i$ defined by the sequence of p bits computed in the previous version followed by a sequence of r bits, varying form $<0>_r$ to $<1>_r$, which corresponds to the index i of the corresponding processing element expressed in binary form. This is equivalent to shift the p most significant bits of a r positions to the left (same as multiply by $2^r$) and add the value of i in binary form, such that $$x_i = a_{23..24-p} \times 2^r + i = <a_{23}..a_{24-p}><i_r..i_1>$$

Accordingly, $x_i^2$ is computed as:

$$\begin{aligned} x_i^2 &= (a_{23}..._{24-p} \times 2^r + i) \times (a_{23}..._{24-p} \times 2^r + i) \\ &= a_{23}..._{24-p} \times a_{23}..._{24-p} 2^{2r} + a_{23}..._{24-p} \times i \times 2^{r+1} + i \times i \\ &= a^2_{47}..._{48-2p} \times 2^{2r} + a_{23}..._{24-p} \times i \times 2^{r+1} + i \times i \end{aligned}$$

Note that multiplying a number by a power of two is equivalent to shift said number to the left as many positions as the value of the power of two. In this connection, let us define the notation $y \leftarrow_n m$ to denote that a binary number x is shifted n positions to the left m times (1 is assumed when n is omitted). We can now rewrite above equation as:

$$x_i^2 = (a^2_{47..48-2p} \leftarrow_2 r) + ((a_{23..24-p} \times i) \leftarrow (r+1)) + (i \times i).$$

Furthermore, the multiplication $a_{23..24-p} \times i$ is a very specific operation implemented for each processor unit i and it involves a partial length number a and a small length constant i. Also, the constant $i \times i$ is specific to the i-th processing unit, and it is prestored in the corresponding processing element.

Evaluation in each processing element is performed in parallel as follows:

$$z_i = ((a^2_{47..48-2p} \leftarrow_2 r) + ((a_{23..24-p} \times i) \leftarrow (r+1)) + (i \times i) \leq \text{norman}_{47..48-2p-2r}),$$

for $1 \leq i \leq 2^r-1$, and the initial position of the bit pattern is computed by summing over the z's, similarly as in the previous version. Then, the r bits of $x_s$ are concatenated to the p most significant bits of a. Additionally, $a^2$, the value of $x_i^2$ when $x_i = x_s$, is defined accordingly, such that:

$$a = x_s = a_{23}..._{24-p}<s_1...s_r>$$
$$a^2 = x_s^2 = (a^2_{47}..._{48-2p \leftarrow 2r}) + ((a_{23}..._{24-p} \times s) \leftarrow (r+1)) + (s \times s).$$

The previous computation is repeated q−1 times, each iteration considering the following r bits of a, and the following 2r bits of norman and $a^2$. Thus, at the jth iteration, $1 \leq j \leq q$, the evaluation criterion is:

$$z_i = ((a_{47..48-2p-2r(j-1)}^2 \leftarrow_2 r) + ((a_{23..24-p-r(j-1)} \times i) \leftarrow (r+1)) + (i \times i) \leq \text{norman}_{47..48-2p-2rj}),$$

where the number compared to norman is $x_i^2$ in the jth iteration. And i, $1 \leq i \leq 2^r$, evaluations we performed in parallel.

The circuit that implements the current version of the method is very similar to that of FIG. 14, except that q iterations are performed instead of only one. Therefore, a control circuit (not shown) is needed to control the number of iterations. Additionally, the number of bits of $x_i$ and norman compared in each processing element is increased by r at each iteration, and the number of processing elements is $2^r$.

Figure 15:
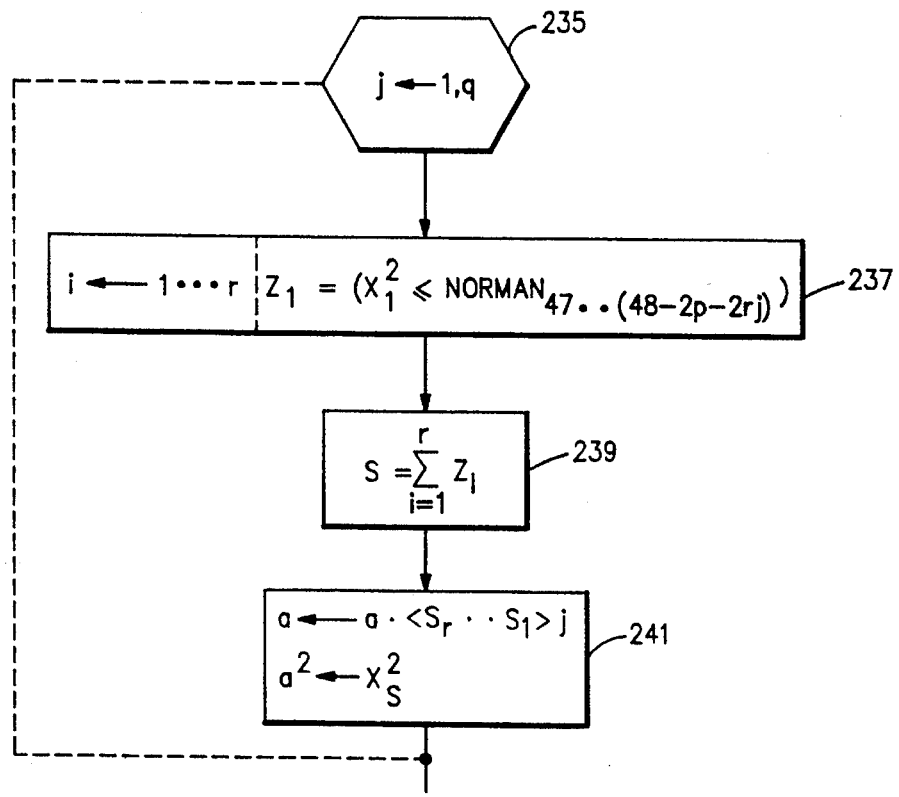
FIG. 15 shows a flow chart corresponding to the iterative parallel version of the claimed method.

FIG. 15 shows a flow chart corresponding to the iterative parallel version of the claimed method. Note that block 235 defines how many iterations will be performed. Block 237 represents the parallel evaluation that occurs at each of the i processing elements. Note that at each iteration more bits of $x_i$ and norman are compared. Block 239 represents the step of searching the bit pattern which corresponds to sum circuit 225 of FIG. 14. In step 241 the values of a and $a^2$ are updated.

Considering the example given in the previous version where the 4 most significant bits of the square root of norman=40627×$2^{32}$ were computed, we can continue calculating the solution by applying the iterative parallel version with q=2 and r=3, that is, 2 iterations of the method will be performed each one adding 3 more bits to the solution. The number of processing elements required is $2^r-1=7$, and the initial values of a and $a^2$ are those found in the previous version, i.e., $a_{23..20}=1100$ $a_{47..40}^2=10010000$ The iteration counter ranges from 1 to 2 and the index i varies from 1 to 7. The development of the current example is given bellow:

First iteration, j=1
$a_{23..20}=1100$
$a_{47..40}^2 \leftarrow_2 3=10010000000000$
$\text{norman}_{47..34}=10011110101100$
i=001
$(a_{23..20} \times i) \leftarrow 4=11000000$
$i \times i = 000001$
$x_1^2=10010011000001$
z=1
i=010
$(a_{23..20} \times i) \leftarrow 4=110000000$
$i \times i = 000100$
$x_2^3=10010110000100$
z=1
i=011
$(a_{23..20} \times i) \leftarrow 4=1001000000$
$i \times i = 001001$
$x_3^2=10011001001001$
z=1 i=100
$(a_{23..20} \times i) \leftarrow 4 = 11000000$
$i \times i = 010000$
$x_4^2 = 10011100010000$
$z=1$
i=101
$(a_{23..20} \times i) \leftarrow 4 = 1111000000$
$i \times i = 011001$
$x_5^2 = 10011111011001$
$z=0$
i=110
$(a_{23..20} \times i) \leftarrow 4 = 10010000000$
$i \times i = 100100$
$x_6^2 = 10100010100100$
$z=0$
i=111
$(a_{23..20} \times i) \leftarrow 4 = 10101000000$
$i \times i = 110001$
$x_7^2 = 10100101110001$
$z=0$ Note that initial position s of bit pattern 10 was found in the evaluation corresponding to processing element of index i=4, or i=100 in binary form. Therefore s=110 and the binary sequence 100 is added to the left of $a_{23..20} = 1100$, and the new current interval lower bound becomes $a_{23..17} = 1100100$. Thus the values to be used in the next iteration are the $a_{23..17} = 1100100$ $a_{47..34}^2 = 10011100010000$ Second iteration, j=2
$a_{23..17} = 1100100$
$a_{47..34} \leftarrow_2 3 = 10011100010000000000$
$\text{norman}_{47..28} = 10011110101100110000$
i=001
$(a_{23..17} \times i) \leftarrow 4 = 11001000000$
$i \times i = 000001$
$x_1^2 = 10011100101001000001$
$z=1$
i=010
$(a_{23..17} \times i) \leftarrow 4 = 110010000000$
$i \times i = 000100$
$x_2^2 = 10011101000010000100$
$z=1$
i=011
$(a_{23..17} \times i) \leftarrow 4 = 1001011000000$
$i \times i = 001001$
$x_3^2 = 10011101011011001001$
$z=1$
i=100
$(a_{23..17} \times i) \leftarrow 4 = 1100100000000$
$i \times i = 010000$
$x_4^2 = 10011101110100010000$
$z=1$
i=101
$(a_{23..17} \times i) \leftarrow 4 = 1111101000000$
$i \times i = 011001$
$x_5^2 = 10011110001101011001$
$z=1$
i=110
$(a_{23..17} \times i) \leftarrow 4 = 10010110000000$
$i \times i = 100100$
$x_6^2 = 10011110100110100100$
i=111
$(a_{23..17} i) \leftarrow 4 = 10101111000000$
$i \times i = 110001$
$x_7^2 = 10011110111111110001$
$x=0$ In this second iteration s=110 Thus we have:
$a_{47..34}^2 = 10011110100110100100$
$a_{23..17} = 1100100110$ Note that for each iteration it is shown the calculation of $x_1^2$ and the result of the evaluation at each of the 7 processing elements.

Sequential Version

This version is used to provide 1 bit of the solution in each iteration. It constitutes a special case of the iterative parallel version where r=1. Therefore, 24–p–q×r iterations need to be performed until the least significant bit of the solution is calculated. Again, the results of the previous version is used.

The circuit that implements the current version is also very similar to those of the previous version, except that only one processing element is required since r=1 and $2^r - 1 = 1$. As it is expected, the circuit is simpler and no multiplication is required. During the first iteration, the only point to be considered is:

$$x_1 = a_{23..24-p-qr} \times 2 + 1$$

and corresponding square is:

$$\begin{aligned} x_1^2 &= (a_{23...24-p-qr} \times 2 + 1) \times (a_{23...24-p-qr} \times 2 + 1) \\ &= a_{23...24-p-qr} \times a_{23...24-p-qr} \times 2^2 + \\ &\quad a_{23...24-p-qr} \times 2^2 + 1 \\ &= a_{47...48-2p-2qr}^2 \times 2^2 + a_{23...24-p-qr} \times 2^2 + 1 \\ &= (a_{47...48-2p-2qr} \leftarrow_2 1) + (a_{23...24-p-qr} \leftarrow_2 1) + 1. \end{aligned}$$

The only evaluation is:

$$z_1 = ((a_{47..48-2p-2qr}^2 \leftarrow_2 1) + (a_{23..24-p-qr} \leftarrow_2 1) + 1 \leq \text{norman}_{47..48-2p-2qr-2}).$$

If $z_1 = 0$ then $a_{23..24-p-qr}$ is shifted one position to the left and a binary 0 is added, otherwise, same shift is done and a binary 1 is added, such that, $$a_{23..24-p-qr-1} = l_{23..24-p-qr} w 2^1 + z_1.$$

Also, $$a_{47..48-2p-2qr-2}^2 = a_{47..48-2p-2qr}^2 \leftarrow_2 1 \text{ when } z_1 = 0,$$

and $$a_{47..48-2p-2qr-2}^2 = (a_{47..48-2p-2qr}^2 \leftarrow_2 1)(a_{23..24-p-qr} \leftarrow_2 1) + 1 \text{ when } z_1 = 1.$$

Further iterations are performed in the same manner but with an extra bit a and two additional bits in $a^2$. In general, during the j-th iteration, $1 \leq j \leq 24-p-qr$, evaluation criterion is:

$$z_1 = ((a_{47..48-2p-2qr-2(j-1)} \leftarrow_2 1) + (a_{23..24-p-qr-(j-1)} \leftarrow_2 1) + 1 \leq \text{norman}_{47..48-2p-2qr-2j})$$

and the value of $z_1$ is used to update a and $a^2$ accordingly. Note that by performing this iteration 24–p–qr times, all bits of the solution are provided, one at a time, down to the least significant bit. At this time, the difference between two consecutive points is 1, which is analogous to a stopping criterion equals to one.

Time and Space Trade-Offs

If we make an analysis of the the three versions of the general method and its corresponding circuits, we see that each one has advantages and disadvantages when referring to processing time and space restrictions. The straightforward parallel version can be considered as the fastest although bulkiest version, while the sequential version is the most compact although the most recurrent. The iterative parallel version balances time and space advantages. So as to clearly and objectively compute the three versions described, let us assume that the number of bits of the solution is qr. If each of the versions is uniquely applied to compute the solution, then:

the straightforward parallel version performs 1 iteration with $2^{qr}-1$ processing units, the iterative parallel version performs q iterations with $2^r-1$ processing units each time computing the following r bits of the solution, the sequential version performs qr iterations with only one processing unit.

Clearly, the iterative parallel version is more complex and it requires more time to execute than the sequential version.

A reasonable approach that should be considered when combining the three versions into one circuit for a specific application is the following:

the straightforward version should be applied to provide the p most significant bits of the solution, where p is the maximum number possible considering packing restrictions of the hardware available;

the iterative parallel version should be applied to provide the following qr bits where q and r are chosen such that the $2^4-1$ short, specific and parallel multiplications to be executed q times and involving at most (p+qr)r bits, are faster than computing the qr bits applying the sequential version;

the sequential version should be applied to provide the remaining bits.

The current apparatus to calculate the square root of a floating point number can be included as a function in any mathematical compressor attached to single processor computers. It can also be implemented in a chip as a unique function in order to gain the maximum performance possible.

Figure 16:
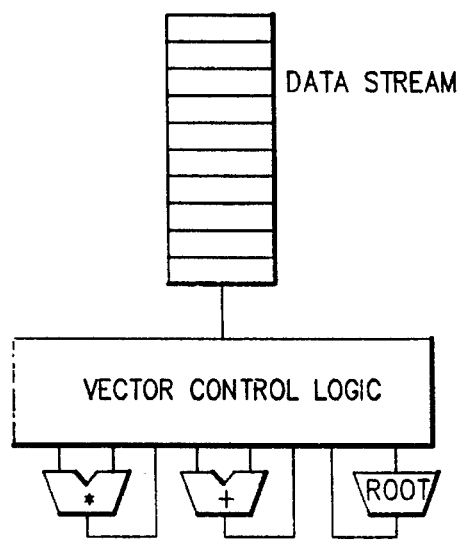
FIG. 16 is a schematic diagram that shows the apparatus for computation of the square root embedded in the set of operations of a vectorized architecture.

Additionally, the current apparatus can be embedded in the set of operations of a vectorized architecture. This enables the computation of the square root of a stream of numbers with only one instruction. FIG. 16 illustrates this idea schematically. Since square root computations are expected to require more time than basic arithmetic and logic operations, some synchronization of the pipeline stream must be considered. In order to solve this problem, a number of square root units can be included in parallel to match the pipeline speed.

The claimed method and apparatus provide solution for a variety of numerical problems that ranges from general to more specific ones, while substantially reducing the processing time required to solve said problems. Combination of different versions of the method can be used to solve specific problems which generates more complex circuits. While the invention has been shown and described with reference to some numerical problems, it will be obvious to those skilled in the art, that for solving other specific problems, changes and modifications may be made in the claimed method and apparatus without departing from the spirit and the scope of the invention.

We claim:

1. A method for using independent processing elements operating in parallel to reduce a processing time required to solve numerical problems, wherein a solution for a given problem is confined in a known initial search interval determined according to said given problem, said method comprising the steps of:

selecting N points in said initial search interval;

inputting said N points to N processing elements operating in parallel, wherein one of said N points is inputted to a corresponding one of said N processing elements;

said N processing elements performing in parallel evaluations at each of said N points, wherein the criteria for said evaluation is determined according to said given problem, and a result of each of said evaluations is either a binary 0 or a binary 1;

building a sequence of binary bits corresponding to the results of said evaluations;

inputting said sequence of binary bits to a sequential circuit;

searching within said sequence of binary bits using said sequential circuit, a certain bit pattern which consists of a subsequence of bits, wherein said certain bit pattern is defined according to said given problem;

repeating aforementioned steps over a search interval defined by an interval between two points of said N points whose corresponding bits are first and last bits of said subsequence until said search interval is reduced to a predetermined size defined according to said given problem; and selecting the solution from the search interval, wherein a processing time required to obtain said solution is reduced by using the aforementioned steps.

2. The method of claim 1 applied to solve numerical problems over a floating point domain in a computer with N processing elements operating in parallel wherein:

said selecting step comprises a selection of N points in the initial search interval such that said initial search interval is first divided into a number of macro-intervals and then each macro-interval is divided into a number of sub-intervals.

3. The method of claim 2, wherein:

said N selected points are equally spaced.

4. The method of claim 3, wherein a number of consecutive bits, from the left most to the right most bit, of a solution of a given problem is provided at each iteration of the method, and wherein:

said number of macro-intervals is equal to $2^v$, where $v=\lceil\log(|pat|-1)\rceil$ and $|pat|$ is the length of said bit pattern;

said number of sub-intervals is equal to $2^r$, where r is said number of consecutive bits of the solution provided at each iteration of the method; and said predetermined size to which the search interval must be reduced so as to stop the method of performing further iterations is equal to $2^v$.

5. The method of claim 4, wherein:

the value of r is not necessarily constant for all iterations of the method.

6. The method of claim 1, wherein said given problem is a problem of finding a zero of a function;

said certain bit pattern searched by said sequential circuit is 10;

the criteria for said evaluations is such that a binary 1 is added to said sequence of bits input to said sequential circuit whenever the value of said function is non positive and a binary 0 is added otherwise; and said predetermined size to which the search interval must be reduced so as to stop the method of performing iterations is equal to 1.

7. The method of claim 4, wherein:

said given problem is a problem of finding a zero of a function;

said certain bit pattern searched by said sequential circuit is 10; and the criteria for said evaluations is such that a binary 1 is added to said sequence of bits input to said sequential circuit whenever the value of said function is non positive and a binary 0 is added otherwise.

8. The method of claim 1 or 4, wherein:

said given problem is a problem of finding a fixed point of a function.

9. The method of claim 1, wherein:

said given problem is a problem of finding a minimum of a convex function;

said certain bit pattern searched by said sequential circuit is 110;

the criteria for said evaluations is such that a binary 1 is added to said sequence of bits input to said sequential circuit whenever the difference of the values of the function at two consecutive points is non positive, and a binary 0 is added otherwise; and said predetermined size to which the search interval must be reduced so as to stop the method of performing iterations is equal to 2.

10. The method of claim 4, wherein:

said given problem is a problem of finding a minimum of a convex function;

said certain bit pattern searched by said sequential circuit is 110; and the criteria for said evaluations is such that a binary 1 is added to said sequence of bits input to said sequential circuit whenever the difference of the values of the function at two consecutive points is non positive, and a binary 0 is added otherwise.

11. The method of claim 1, wherein:

said given problem is a problem of finding a maximum of a concave function;

said certain bit pattern searched by said sequential circuit is 110;

the criteria for said evaluations is such that a binary 0 is added to said sequence of bits input to said sequential circuit whenever the difference of the values of the function at two consecutive points is non positive, and a binary 1 is added otherwise; and said predetermined size to which the search interval must be reduced so as to stop the method of performing iterations is equal to 2.

12. The method of claim 4, wherein:

said given problem is a problem of finding a maximum of a concave function;

said certain bit pattern searched by said sequential circuit is 110; and the criteria for said evaluations is such that a binary 0 is added to said sequence of bits input to said sequential circuit whenever the difference of the values of the function at two consecutive points is non positive, and a binary 1 is added otherwise.

13. The method of claim 1 or 4, wherein:

said given problem is a problem of finding all critical points of a function.

14. The method of claim 5, wherein:

solution for said given problem is reached by applying, consecutively, different versions of said method with different values of r, wherein each version is applied to solve a problem not necessarily equal to the previous one.

15. An apparatus for reducing a processing time required to solve numerical problems, wherein a solution for a given problem is confined within a known initial search interval determined according to said given problem, said apparatus comprising:

first and second input latches for receiving initial search interval boundaries;

a comparator for comparing the length of a current search interval to a predetermined value defined according to said given problem;

a division circuit connected to said first and second input latches and to said comparator for dividing the current search interval into smaller intervals by selecting N points in said current search interval;

N processing elements operating in parallel, each of said N processing elements coupled to said division circuit for receiving as input a corresponding one of said N points selected by said division circuit, said N processing elements performing evaluations in parallel, wherein criterion for said evaluations is defined according to said given problem, and the result of each of said evaluations is either a binary 0 or a binary 1;

a sequential circuit coupled to said N processing elements for receiving a sequence of binary bits corresponding to the results of said evaluations and for searching a bit pattern within the sequence of binary bits, wherein said bit pattern is defined according to said given problem;

first selector means for selecting two points corresponding to first and last bits of said bit pattern and for updating the search interval by substitution of current search interval boundaries by said selected points, wherein outputs of said first selector means are connected to said first and second input latches; and second selector means connected to said comparator for selecting the final solution from the current search interval.

16. The apparatus of claim 15 applied to solve numerical problems over a floating point domain in a computer with N processing elements operating in parallel, wherein:

said division circuit selects N points in the search interval such that said interval is first divided into a number of macro-intervals and then each macro-interval is divided into a number of sub-intervals.

17. The apparatus of claim 16, wherein:

said N selected points are equally spaced.

18. The apparatus of claim 17, wherein a number of consecutive bits of the solution of a given problem, starting from the left most bit to the right most bit, is provided each time the apparatus performs one iteration of the corresponding claimed method, and wherein:

said division circuit is formed by two sets of assembling means such that:

a first set constitutes a series of $2^v+1$ assemblers that provides binary numbers corresponding to points in the search interval that divide said interval into $2^v$ equally spaced macro-intervals, where $v= \lfloor \log(|pat|-1) \rfloor$ and $|pat|$ is the length of said bit pattern, and a second set constitutes a series of $2^v$ groups of $2^r-1$ assemblers that provides binary numbers corresponding to points in the search interval that divide each of said previously defined macro-intervals into $2^r$ equally spaced sub-intervals, where r is said number of consecutive bits of the solution provided at each iteration of the method; and said predetermined size to which said comparator compares the length of the current interval is equal to $2^v$.

19. The apparatus of claim 18, further comprising:

third selector means for selecting N points from the $2^{v+r}+1$ points provided by said two sets of assembling means prior to parallel processing;

third input means for receiving the initial value of m, where $2^m$ is the number of points within a macro-interval;

means for updating the value of m; and control means for controlling the inputs of said first, second, and third input means by using two control lines and a set of logic gates, wherein initial search interval boundaries and initial value of m will be the inputs if a first control line is active, while the outputs of first selector means and said m updating means will be the inputs if a second control line is active.

20. The apparatus of claims 18 or 19, wherein:

the value of r is not necessarily constant for all iterations of the method.

21. The apparatus of claims 18 or 19, wherein:

the number of points, internal to the search interval, provided by said two sets of assembling means, $2^{v+r}-1$ is equal to N; and, the N points selected by said third selector means are the points internal to the search interval.

22. The apparatus of claim 18, wherein:

said second selector means selects an interval lower bound as the final solution.

23. The apparatus of claim 18, wherein:

said second selector means selects an interval middle point as the final solution.

24. The apparatus of claim 15, wherein:

said given problem is the problem of finding a zero of a function;

said bit pattern is 10;

the criteria for said evaluations is such that a binary 1 is added to said sequence of bits whenever the value of said function is non positive and a binary 0 is added otherwise; and said predetermined size to which the search interval must be reduced so as to stop the method of performing iterations is equal to 1.

25. The apparatus of claims 18 or 19, wherein:

said given problem is the problem of finding a zero of a function;

said bit pattern is 10; and the criteria for said evaluations is such that a binary 1 is added to said sequence of bits whenever the value of said function is non positive and a binary 0 is added otherwise.

26. The apparatus of claim 15, 18 or 19, wherein:

said given problem is the problem of finding a fixed point of a function.

27. The apparatus of claim 15, wherein:

said given problem is a problem of finding the minimum of a convex function;

said bit pattern is 110;

the criteria for said evaluations is such that a binary 1 is added to said sequence of bits whenever the difference of the values of the function at two consecutive points is non positive, and a binary 0 is added otherwise; and said predetermined size to which the search interval must be reduced so as to stop the method of performing iterations is equal to 2.

28. The apparatus of claim 18 or 19, wherein:

said given problem is a problem of finding the minimum of a convex function;

said bit pattern is 110; and the criteria for said evaluations is such that a binary 1 is added to said sequence of bits whenever the difference of the values of the function at two consecutive points is non positive, and a binary 0 is added otherwise.

29. The apparatus of claim 15, wherein:

said given problem is a problem of finding the maximum of a concave function;

said bit pattern is 110;

the criteria for said evaluations is such that a binary 0 is added to said sequence of bits whenever the difference of the values of the function at two consecutive points is non positive, and a binary 1 is added otherwise; and said predetermined size to which the search interval must be reduced so as to stop the method of performing iterations is equal to 2.

30. The apparatus of claim 18 or 19, wherein:

said given problem is a problem of finding the maximum of a concave function;

said bit pattern is 110; and the criteria for said evaluations is such that a binary 0 is added to said sequence of bits whenever the difference of the values of the function at two consecutive points is non positive, and a binary 1 is added otherwise.

31. The apparatus of claim 15, 18 or 19, wherein:

said given problem is a problem of finding all critical points of a function.

32. The apparatus of claim 19, wherein said second selector means selects an interval lower bound as the final solution.

33. The apparatus of claim 20, wherein said second selector means selects an interval lower bound as the final solution.

34. The apparatus of claim 21, wherein said second selector means selects an interval lower bound as the final solution.

35. The apparatus of claim 19, wherein said second selector means selects an interval middle point as the final solution.

36. The apparatus of claim 20, wherein said second selector means selects an interval middle point as the final solution.

37. The apparatus of claim 21, wherein said second selector means selects an interval middle point as the final solution.

* * * * *